US009027624B2

(12) United States Patent
Quah et al.

(10) Patent No.: US 9,027,624 B2
(45) Date of Patent: May 12, 2015

(54) TAPE DEVICE

(75) Inventors: Chin Cheng Quah, Penang (MY); Tong Shan Wong, Penang (MY); De Yi Quah, legal representative, Georgetown (MY)

(73) Assignee: Widetech Manufacturing SDN. BHD., Bayan Lepas, Penang (MY)

( * ) Notice: Subject to any disclaimer, the term of this patent is extended or adjusted under 35 U.S.C. 154(b) by 234 days.

(21) Appl. No.: 13/876,852

(22) PCT Filed: Nov. 30, 2010

(86) PCT No.: PCT/MY2010/000313

§ 371 (c)(1), (2), (4) Date: Mar. 29, 2013

(87) PCT Pub. No.: WO2012/044153

PCT Pub. Date: Apr. 5, 2012

(65) Prior Publication Data

US 2013/0192763 A1 Aug. 1, 2013

(30) Foreign Application Priority Data

Sep. 30, 2010 (MY) ............................ PI2010004599

(51) Int. Cl.
*B32B 37/22* (2006.01)
*B43L 19/00* (2006.01)
*B65H 37/00* (2006.01)

(52) U.S. Cl.
CPC .......... *B43L 19/0068* (2013.01); *B65H 37/007* (2013.01); *B65H 37/00* (2013.01)

(58) Field of Classification Search
CPC ..................................................... B65H 37/007
USPC ......... 156/523, 574, 577, 579, 527, 238, 538, 156/540; 118/76, 200, 257; 206/411; 242/170, 171, 588.2, 588.3, 588.6, 242/588, 160.2, 160.4
See application file for complete search history.

(56) References Cited

U.S. PATENT DOCUMENTS

| | | | | |
|---|---|---|---|---|
| 6,079,660 | A * | 6/2000 | Manusch et al. | 242/538.1 |
| 6,321,816 | B1 | 11/2001 | Koreska | |
| 6,453,969 | B1 * | 9/2002 | Ferrara | 156/577 |
| 6,582,514 | B1 * | 6/2003 | Yang | 118/76 |
| 6,622,768 | B2 * | 9/2003 | You | 156/577 |
| 7,228,882 | B2 * | 6/2007 | Marschand et al. | 156/523 |
| 2002/0069974 | A1 * | 6/2002 | Niermann | 156/577 |
| 2009/0185849 | A1 * | 7/2009 | Narita | 401/88 |
| 2010/0071853 | A1 * | 3/2010 | Wu | 156/538 |
| 2010/0206488 | A1 | 8/2010 | Matsushita et al. | |
| 2012/0168547 | A1 * | 7/2012 | Kropp | 242/364 |

FOREIGN PATENT DOCUMENTS

| | | |
|---|---|---|
| JP | 2004-066688 A | 3/2004 |
| JP | 2004-299249 A | 10/2004 |

* cited by examiner

*Primary Examiner* — Mark A Osele
(74) *Attorney, Agent, or Firm* — Nixon Peabody LLP; Jeffrey L. Costellia

(57) ABSTRACT

The present invention relates to a tape guiding mechanism (10) of a tape device (100). The tape device (100) comprises a strip of tape (20) having supply tape (22) and take up tape (24); a spool portion (130); a supply spool (40) disposed at the spool portion (130) for winding the supply tape (22); a take up spool (50) disposed at the spool portion (130) for winding the take up tape (24); an application tip (12); and a spool mechanism (70) for allowing the supply and the take up spools (40 & 50) to rotate such that the tape travels from the supply spool (40), around the applicator tip (120), and to the take up spool (50).

53 Claims, 25 Drawing Sheets

TAPE DEVICE

FIELD OF THE INVENTION

The present invention relates to a tape device.

BACKGROUND ART

In a correction tape dispenser, it is important that a strip of tape travels along a correct traveling path. However, it is unavoidable that the tape is required to travel some curved paths in the correction tape dispensers as the tape travels in a loop.

Due to some of the curvy traveling paths, it is difficult to provide enough gliding paths for the tape to glide on. Most of the gliding paths can usually be provided on the applicator head only. However, the gliding paths provided thereon are still not long enough for the tape to travel on. Furthermore, lack of gliding paths is more evident in places where the traveling paths are situated between the applicator head and the spools. If lack of gliding paths is such a case, the gliding paths are unable to provide enough guidance to the tape. The tape can easily sidetrack from the traveling path. Apart from that, the support from the gliding paths is not enough for the tape. It is difficult for the tape to run smoothly. Furthermore, the tape can easily damage.

Also along these curved paths, it is often observed that the tape tends to become loose. Particularly, the tape is more prone to loosening at the application head.

Due to such tape loosening, there is a tendency in designs where the axis of rotation of the spools is arranged perpendicular to the applicator head edge, instead of parallel to the edge. However, it appears apparently that such a design, which is known as a horizontal correction tape dispenser, does not adequately overcome the problem of tape loosening. As such, it is still observed that the tape is loose particularly around the applicator head.

Besides that, the shape of the applicator head often relies on the shape of the spools to form a tape loop. Alternatively, the applicator head is often formed in such a shape that can ease the tape to travel from the spools. As such, if seen from sideways, the applicator head often comes in a triangular or a circular shape. Because of these shapes, with reference to FIG. 1, a gap tends to form between the tape and its gliding path.

It is important that the bottom surface of a gliding tape always remains touching the gliding path around the applicator head so that the correction layer can be applied properly, i.e. no tape loosening. In light of this, it is also often seen in prior arts that protuberances or ridges are always formed on top of the gliding path around the applicator head. These protuberances are always formed in a rounded shape or as a slope.

These protuberances maintain the tape so that the tape always remains in touch with the gliding path. As a result of this, such protuberances can also act as if a mechanism to "pull" or cause the tape to be tighter around the applicator head. However, since the protuberance only remains in touch with the tape at certain area thereof, the tightening effect can only work around the same area. Hence, the tightening effect is only limited to a small area of contact between the protuberance and the tape. Because of this, these protuberances are unable to tighten the tape sufficiently around the applicator head.

There are also often instances in which the loosen tape slips off or does not follow the traveling path anymore. As such, guidance features (sidewalls, groove, ribs, and etc.) are provided to guide the tape. The guidance features should include the afore-mentioned protuberances as these protuberances also contribute to the guidance of the tape particularly around the applicator head.

Although there are guiding features, due to the tendency of the tape to become loose at the curved paths, it is difficult for the tape to tightly glide on top of most of gliding paths. Also, for this same reason, the tape does not often wind the applicator head tightly. In light of this, it is apparent that without the tape traveling tightly along the traveling path or the tape winding tightly around the applicator head, it is difficult for the guiding features to guide the tape along the traveling path.

Moreover, such guiding features are usually a waste of material. Due to the material consumption, higher costs are involved. Given that these guiding features are formed in miniature detail, they are quite complex to be manufactured. As a result of this, more time is also needed for manufacturing.

Apart from that, most of these correction tape dispensers consist of parts, which require extra material, labor, assembly, and other affecting costs to manufacture. Therefore, there is a need for a correction tape dispenser in reduced number of parts, where this would tremendously affect the entire cost of manufacturing.

In addition, current correction devices are shaped in a way that do not guide the user's hand to hold the correction device in a preferred manner. This leads to users experiencing fatigue, discomfort through prolonged use of the device due to using the improper hold.

Majority of the correction devices available are biased towards right handed users, hence left handed users would have difficulty in holding the correction devices comfortably.

Due to the construction of the correction devices currently available, many can easily break when dropped due to having a parting line between the top and bottom of the body.

There are not many correction devices that are ergonomically shaped and resistant to drops from tables to the ground, from a throw, or an abrupt descent to the ground.

Typically, such correction tape dispensers consist of a main body for accommodating the correction tape supply reel and take up reel, and an applicator head for guiding the correction tape and applying the same on a surface to cover the clerical errors. In this type of correction pen, the applicator head is not tightly attached to the main body so that during operation, the applicator head and main body are moveable in relation to each other for preventing excess pressing force exert by a user in which the excess pressing force might break the correction tape dispenser.

One example of this type of correction tape dispenser is described in European publication EP 2 070 856 A1. In this prior art, the correction tape dispenser consists of a housing accommodating a correction tape supply reel and take up reel, and an applicator head longitudinally projecting from said housing with said correction tape extending from the supply reel at the lower longitudinal side of the applicator head facing the correction surface. The applicator head consists of at least one guiding wing, characterized in that the at least one guiding wing is partially curved and that the partially curved guiding wing is attached to the front portion of the applicator head.

The primary object of this prior art is to properly guide the correction tape, and improve the flexibility and structural strength of the applicator head. By having the guiding wing structure attached to the front portion of the applicator head, it is able to prevent the correction tape from evading the applicator head and compensate the excess pressing force exert by a user. However, the disadvantage of this prior art is that this applicator head required higher number of components to manufacture, as the structure of the applicator head is substantially complex, which required components such as the applicator head and the guiding wing arranged in multiple planes. Therefore, the correction tape dispenser also increases the cost, complexity of mould, tooling and moulding process, and complexity of manufacturing process.

Hence, there is a need to provide an applicator head for a correction tape dispenser that is able to reduce the number of components, complexity of the structure, complexity of mould, complexity of tooling and moulding process, and the complexity of manufacturing, and provide higher flexibility and structural strength.

In light of the above, a correction tape dispenser device that can overcome the above-mentioned drawbacks is therefore very much needed.

SUMMARY OF THE INVENTION

The present invention relates to a tape device.

Accordingly, there is a correction tape device comprising a strip of tape having supply tape and take up tape; a spool portion; a supply spool disposed at the spool portion for winding the supply tape; a take up spool disposed at the spool portion for winding the take up tape; an applicator tip; and a spool mechanism for allowing the supply and the take up spools to rotate such that the tape travels from the supply spool, around the applicator tip, and to the take up spool. The supply tape travels from the supply spool to the applicator tip whereas the take up tape travels from the applicator tip to the take up spool.

The tape device further comprises a tape guiding mechanism. The tape guiding mechanism is adapted for guiding the tape, and preventing tape loosening and sidetrack. The tape guiding mechanism comprises an application portion having an applicator head, a slit formed at the rear portion of the application portion, and a slant connected to the rear end of the application portion.

The application portion is formed in a substantially flat shape occupying substantially a single plane. The tape travels around the application portion substantially on a single plane. The slit is adapted for guiding the tape and allowing the supply tape to pass through. The slant is adapted to bend downwards from the rear portion of the applicator head to the spool portion. The slant causes the spool portion to locate the spools in such a manner that the single plane of the application portion is substantially aligned with the plane between the spools.

Preferably, the correction tape dispenser device further comprises a plurality of connectors for connecting the base and cover of the casing.

Preferably, the correction tape dispenser device is moulded and manufactured of only two main parts, which is the base and cover of said casing, wherein the base of said correction tape dispenser is combined with the applicator to form one body.

It is an object of the present invention to provide a tape guiding mechanism that guides the tape from the supply spool to the application portion, along the application portion towards the applicator tip, through the slit, along the application portion towards the take up spool, and back to the take up spool.

It is also an object of the present invention to provide a tape guiding mechanism that allows the tape to travel along the application portion substantially in a single plane.

It is also object of the present invention to provide a tape guiding mechanism that guides the tape around the application portion, particularly in a single plane.

It is also an object of the present invention to provide a slit for guiding the tape to the applicator head. The applicator head and the slit form a tape traveling path/guidance to guide the tape to move from the slit to the applicator tip.

It is also an object of the present invention to provide a slant for guiding the tape; allowing the tape to travel from the supply spool to the application portion; along the application portion, particularly in a single plane, towards the applicator tip; through the slit; along the application portion, particularly in the single plane, towards the take up spool; and back to the take up spool.

It is further an object of the present invention to provide a tape guiding mechanism that prevents tape loosening. The tape guiding mechanism allows the tape to travel from the supply spool to the application portion, along the application portion towards the applicator tip, through the slit, along the application portion towards the take up spool, and back to the take up spool in a substantially tight manner. The tape is allowed to glide on adequate gliding paths on the slant, and around the application portion, including through the slit.

It is further an object of the present invention to provide enough gliding paths for the tape to glide on such that enough support is given to the tape. The tape does not easily damage. The gliding paths also provide enough guidance to the tape such that the tape does not sidetrack from its traveling path and the tape can run smoothly.

It is further an object of the present invention to provide a slant for providing a base that locates the supply and take up spools such that the single plane of the application portion is substantially aligned with the plane between the spools such that the tape traveling along the application portion substantially in the aligned single plane can optimizes the guidance provided by the tape guiding mechanism.

It is further an object of the present invention to provide a tape device that can reduce manufacturing material consumption, the involved manufacturing costs, the complexity to manufacture such an applicator head, and the time for manufacturing the said applicator head.

It is further an object of the present invention to provide a correction tape dispenser with reduced number of parts for dispensing correction tape onto a surface effectively.

The objective of the present invention is to provide an ergonomic correction device that reduces users' fatigue, discomfort and injury from use, with a shape that is suitable for both left handed and right handed use. Furthermore, having a construction that is resilient to drops from tables, from a throw, an abrupt descent to the ground.

The invention is a correction device comprising, an upper shell having a curved surface for guiding a user's hand to hold the correction device in a preferred manner. Furthermore, the chassis having a curve between the applicator tip and spool shaft for guiding at least a finger of the user to hold the correction device in a preferred manner. A spool shaft and a tape guide may be integrated with the chassis as a unibody.

A correction device, whereby the curve of the chassis allows the tape to be in tension at the applicator tip and provides a rest for at least a finger when the device is in use.

A correction device having an angled rear, whereby the chassis having a rear angled upwards for providing a rest support in the hand of a user when combined with the upper shell. The angled rear of the chassis reduces exposure to sharp edges providing a safe grip.

A correction device having an upper shell, whereby the upper shell may have a shape that provides a holding grip for the hand of a user. The upper shell having a shape that provides a holding grip for both left-handed and right-handed users.

The chassis of the correction device may be embedded in the upper shell when assembled, thereby shifting the parting line between the chassis and upper shell at the bottom of the correction device. Further having the applicator tip integrated with the chassis as a unibody.

The object of the present invention is to provide a horizontal correction tape dispenser for reducing the number of components, complexity of the structure, complexity of mould, complexity of tooling and moulding process, and complexity of manufacturing the same. Also, the horizontal correction tape dispenser with reduced number of components and complexity of the structure is still able to maintain the flexibility and structural strength.

In one embodiment of the present invention or still in the same embodiment as the above main embodiment, the horizontal correction tape dispenser of what will be hereinafter described comprises of any kind of correction tape dispenser, such as the single piece correction tape dispenser where the applicator head is detachably attached to the main body and the multiple piece correction tape dispenser where the applicator head is permanently attached to the main body. The correction tape dispenser of the present invention comprises of a body for accommodating a correction tape supply reel and take up reel, a cover fastened on the body for covering the correction tape supply reel and take up reel, and a single plane applicator head attached to the body for guiding the correction tape.

In another embodiment of the present invention or still in the same embodiment as the above main embodiment, the single plane applicator head is preferably but not limited to permanently attached to the body.

In still another embodiment of the present invention or still in the same embodiment as the above main embodiment, the single plane applicator head comprises of two notch-shaped ridges laterally attached to the side surface of the applicator head. Furthermore, the applicator head further comprises two bent ridges attached to the bottom surface for strengthening the structure.

In still yet another embodiment of the present invention or still in the same embodiment as the above main embodiment, the single plane applicator head is formed by two vertical supporting means and a horizontal guiding means attached to the front portion of the said vertical supporting means.

The above embodiments advantageously provide a horizontal correction tape dispenser, which is able to reduce the number of components, complexity of the structure, complexity of mould, complexity of moulding and tooling, and complexity of manufacturing the same, and provide higher flexibility and structural strength.

The horizontal correction tape dispenser is made of polypropylene, polyamide or any other suitable material as long as the materials provide desired flexibility to the applicator head.

The present invention consists of certain novel features and a combination of parts hereinafter fully described and illustrated in the accompanying drawings and particularly pointed out in the appended claims; it being understood that various changes in the details may be made without departing from the scope of the invention or sacrificing any of the advantages of the present invention.

BRIEF DESCRIPTION OF THE DRAWINGS

For the purpose of facilitating an understanding of the invention, there is illustrated in the accompanying drawings the preferred embodiments from an inspection of which when considered in connection with the following description, the invention, its construction and operation and many of its advantages would be readily understood and appreciated.

Figure 1:
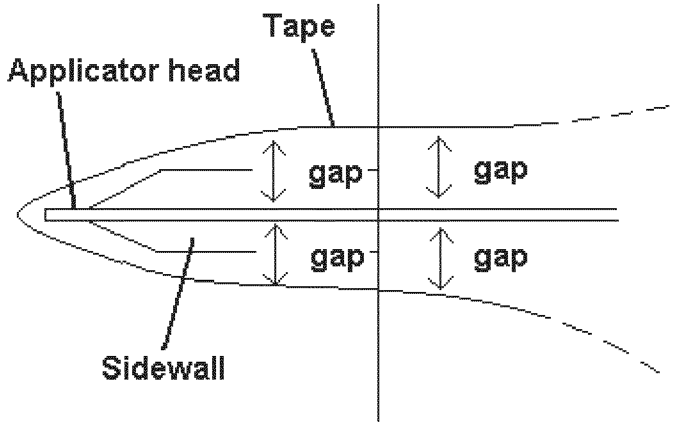
FIG. 1 shows the gaps that tend to form between the tape and the applicator head (the gliding path)
Figure 2:
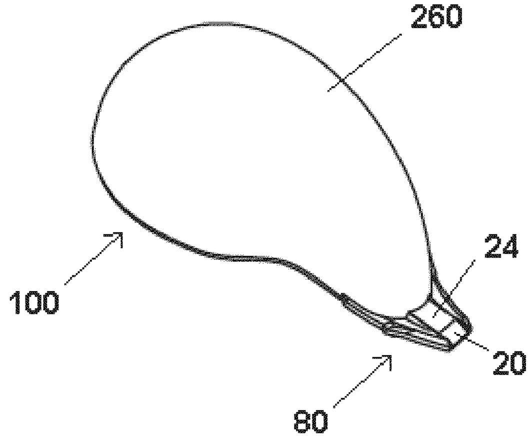
FIG. 2 shows a perspective view of a horizontal correction tape dispenser device of the present invention.
Figure 3:
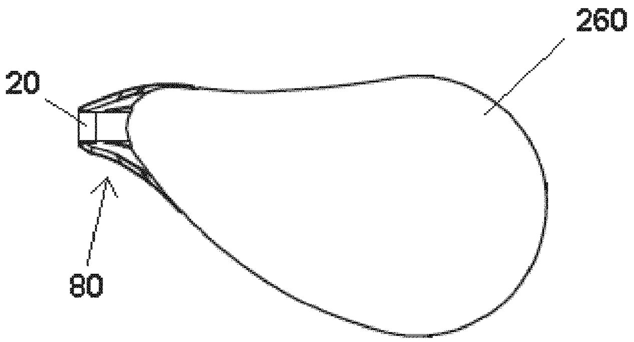
FIG. 3 shows a top view of the horizontal correction tape dispenser device of the present invention.

With easier differentiating between the left side view and the right side view, the said side views are made in reference with holding the horizontal correction tape dispenser in an upright position with the cover facing a user.

DETAILED DESCRIPTION OF THE PREFERRED EMBODIMENTS

The present invention relates to a tape guiding mechanism (10) of a tape device (100). Hereinafter, the tape device (100) and the tape guiding mechanism (10) shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

The configuration of the invention is not limited to the embodiments mentioned in the following description.

As represented in the drawings, the tape device (100) of the present invention is shown. The tape device (100) is a correction tape dispenser device. Particularly, the correction tape dispenser device is a horizontal correction tape dispenser device.

Referring to FIGS. 2 to 9, the horizontal correction tape device (100) of the present invention is shown comprising a top casing (260), and a bottom casing (270). The bottom casing (270) comprises a base (180). The top and bottom casings (260 & 270) are adapted to be assembled together to form a body or a housing for the tape device (100).

Figure 6:
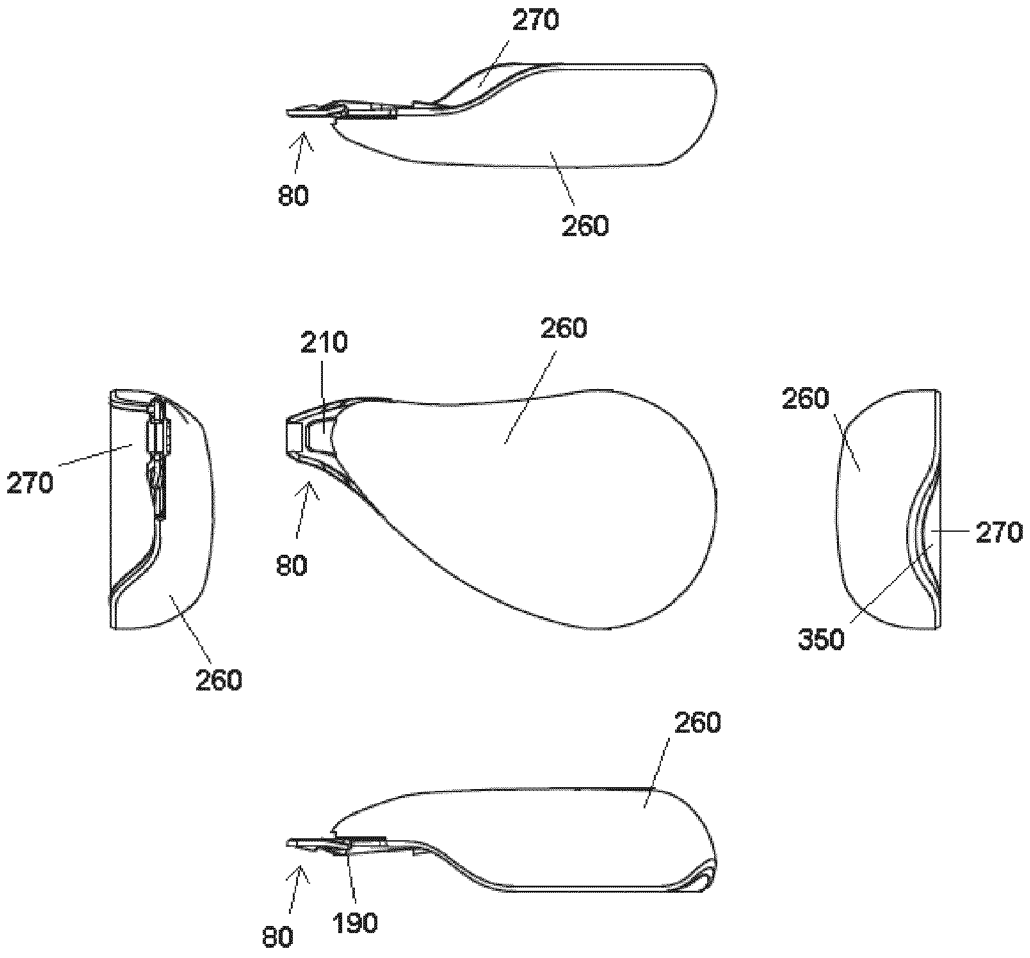
FIG. 6 shows a representation of the horizontal correction tape dispenser device without the tape thereon.
Figure 7:
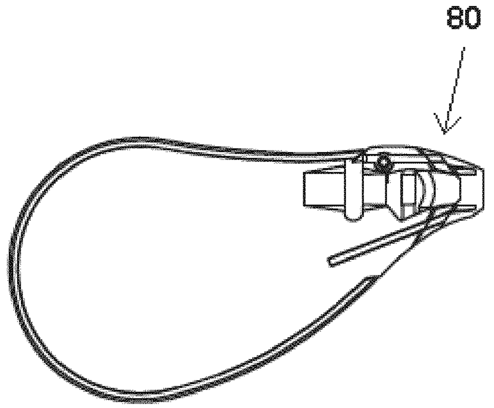
FIG. 7 shows a bottom view of the horizontal correction tape dispenser device without the tape thereon.
Figure 8:
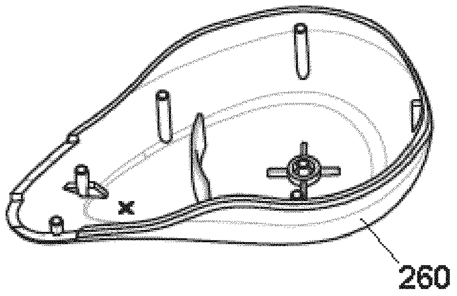
FIG. 8 shows a bottom perspective view of a top casing of the horizontal correction tape dispenser device of the present invention.
Figure 10:
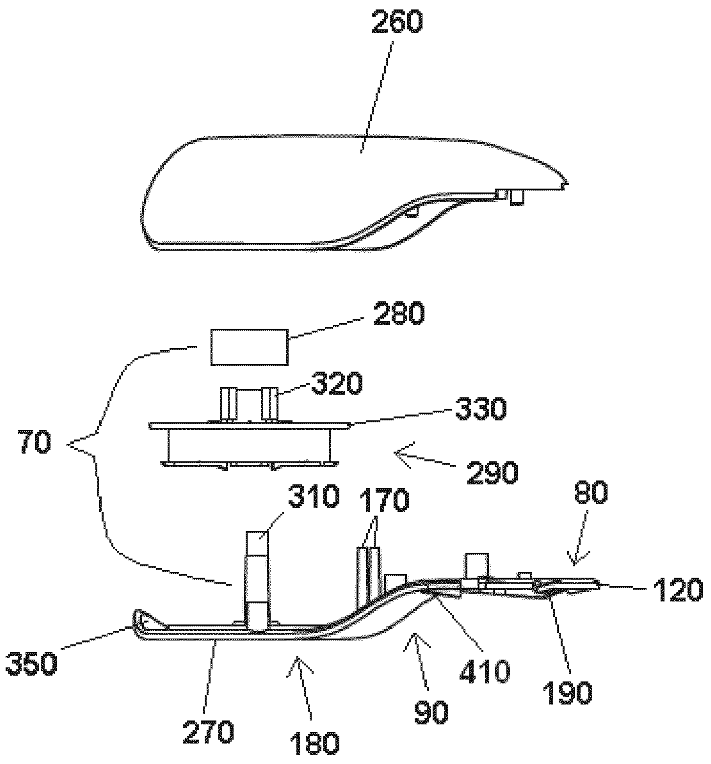
FIG. 10 shows an exploded right side view of the horizontal correction tape dispenser device of the present invention.
Figure 11:
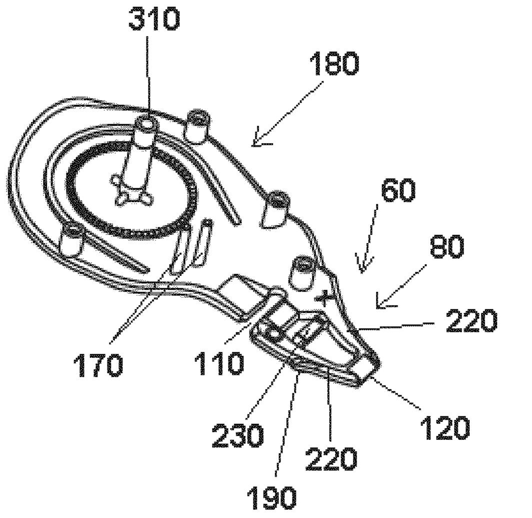
FIG. 11 shows a perspective view of the bottom casing of the horizontal correction tape dispenser device without a spool frame and a core.
Figure 15:
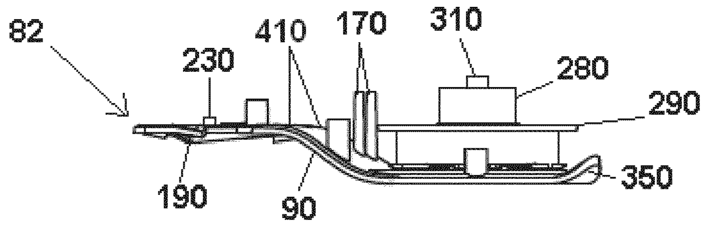
FIG. 15 shows a left side view of the bottom casing of the horizontal correction tape dispenser device with the spool frame and the core.

Referring to the rear view of FIG. 6, the bottom casing (270) is shown comprising an angled rear (350). The angled rear (350) is where the rear portion of the bottom casing (270) raises upwards, as shown in FIGS. 10 & 15. The angled rear (350) is adapted such that the housing of the present correction tape device (100) is able to fit or rest on a user's palm during use.

Referring to FIGS. 9, 10, 13, 14, 18, 19, and 20, the correction tape device (100) further comprises a strip of tape (20), a spool portion (130), a supply spool (40), a take up spool (50), an applicator tip (120), and a spool mechanism (70).

Figure 4:
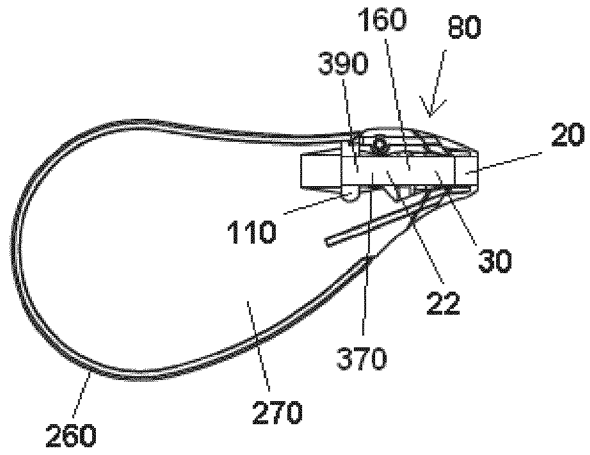
FIG. 4 shows a bottom view of the horizontal correction tape dispenser device of the present invention.
Figure 5:
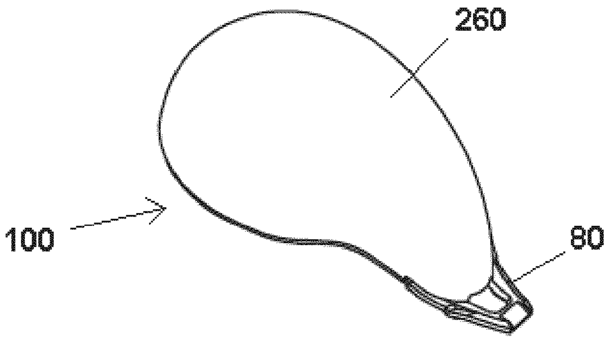
FIG. 5 shows a perspective view of the horizontal correction tape dispenser device without the tape thereon.
Figure 18:
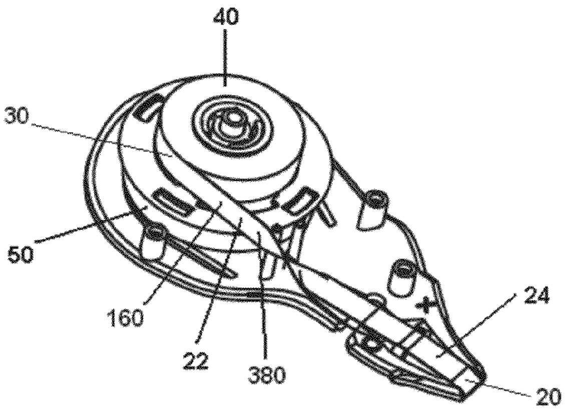
FIG. 18 shows a perspective view of the bottom casing of the horizontal tape dispenser device with the supply and the take up spools thereon.
Figure 22:
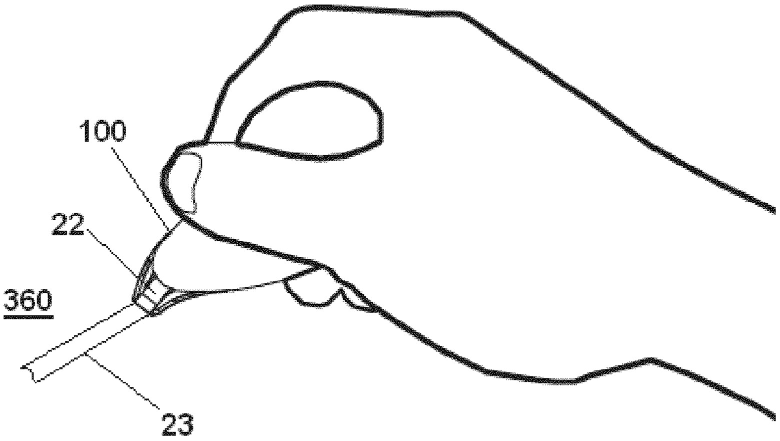
FIG. 22 shows how the horizontal correction tape dispenser is being used to apply a correction layer.

The tape (20) consists of supply and take up tape (22 & 24). The supply tape (22) travels from the supply spool (40) to the applicator tip (120). With reference to FIG. 18, the tape (20) is a correction tape having a correction layer (30) attached to the supply side (160) thereof. Referring to FIGS. 4 and 18, the supply side (160) is disposed at the outer side (380) of the tape (20) when traveling along the applicator head (80) at the application side (370) thereof. Referring now to FIGS. 4 and 22, the correction layer (30) is adhesive at the outer side 390 thereof such that the layer (30) peels off and attaches itself to a surface (360), such as a paper or any piece of document that needs erasing at certain section, that it contacts with during application of the tape onto the surface (360). Referring further to FIGS. 9, 18, 19, 22 and 27, the application takes place substantially at the applicator tip (120). The take up tape (24), in which the correction layer (30) is no longer attached to the supply side (160) of the tape (20), then travels from the applicator tip (120) to the take up spool (50).

Referring now to FIGS. 9 to 10 and 17 to 21, the supply and the take up spools (40 & 50) are disposed at the spool portion (130). The supply spool (40) consists of a core (280). The core 280 is adapted for winding the supply tape (22), whilst the take up spool (50) is adapted for winding the take up tape (24). The spool mechanism (70) is adapted for allowing the supply and the take up spools (40 & 50) to rotate such that the tape (20) is able to travel from the supply spool (40), around the applicator tip (120), and to the take up spool (50).

Referring still to FIGS. 9, 10, 13, 14, 18, 19, and 20, the spool mechanism (70) consists of a spool shaft (310), and a spool frame (290) that is rotatably mounted onto the spool shaft (310).

Figure 9:
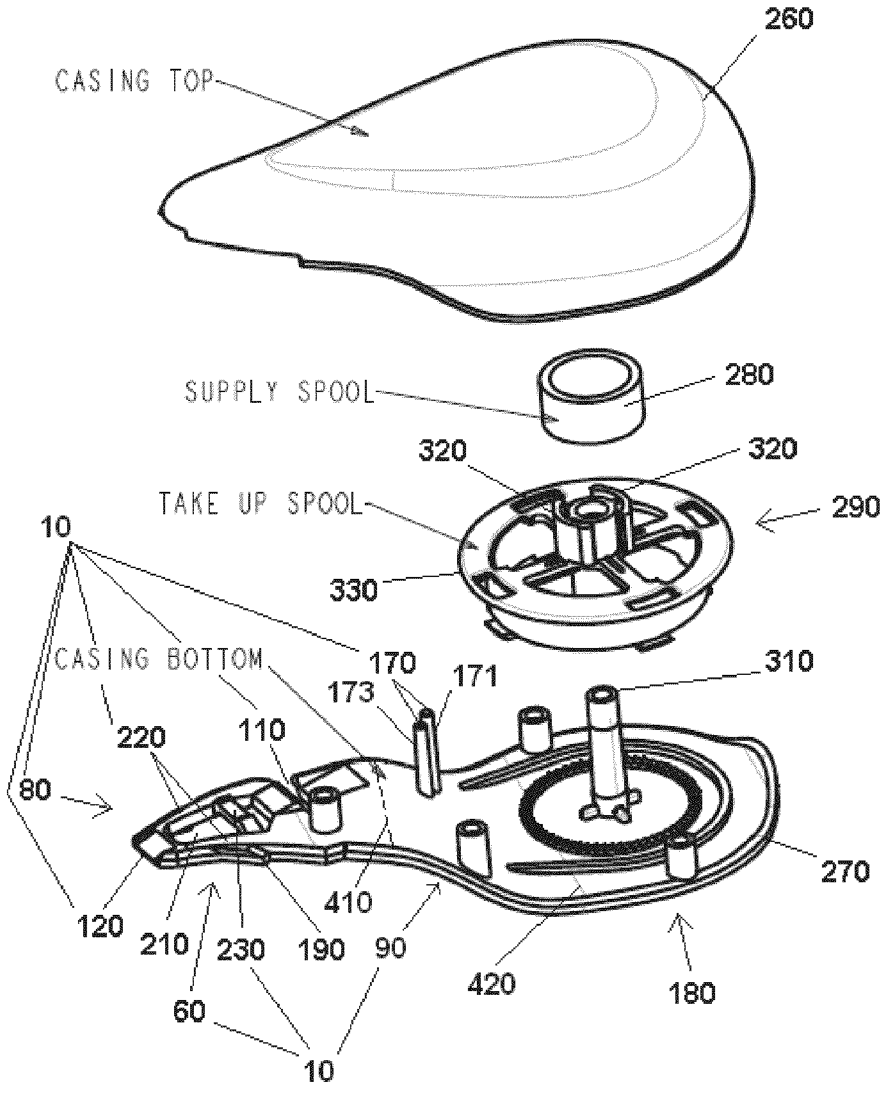
FIG. 9 shows an exploded perspective view of the horizontal correction tape dispenser device of the present invention.
Figure 17:
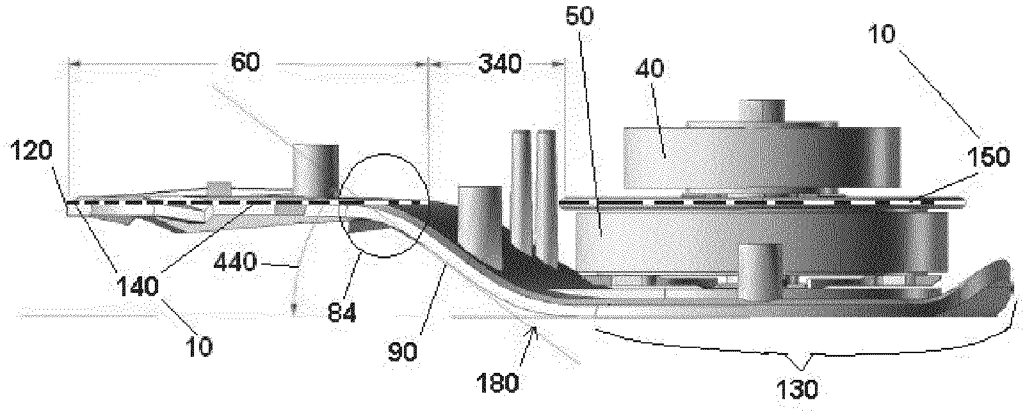
FIG. 17 shows a single plane occupied by an application portion and a plane between a supply and a take up spools.

Referring now to FIGS. 9 & 17, the spool frame (290) consists of a barrier (330). The barrier (330) divides the top and bottom portions of the spool frame (290). The spool frame (290) consists of a retaining structure (320) at the top portion thereof. The core (280) of the supply spool (40) is mounted onto the retaining structure (320), whereas the take up spool (50) is mounted on the bottom portion of the spool frame (290).

Figure 12:
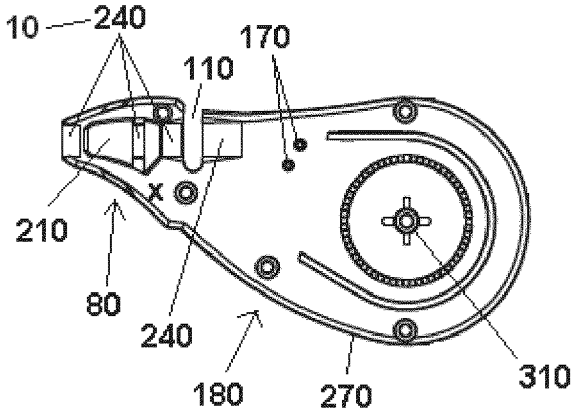
FIG. 12 shows a top view of the bottom casing of the horizontal correction tape dispenser device without the spool frame and the core.

Referring now to FIGS. 9, 12, and 17, the correction tape device (100) further comprises a tape guiding mechanism (10). The tape guiding mechanism (10) is adapted for guiding the tape (20), and preventing tape loosening. The tape guiding mechanism (10) further comprises an application portion (60), a slit (110), and a slant (90), as will be hereinafter described in greater detail.

Figure 19:
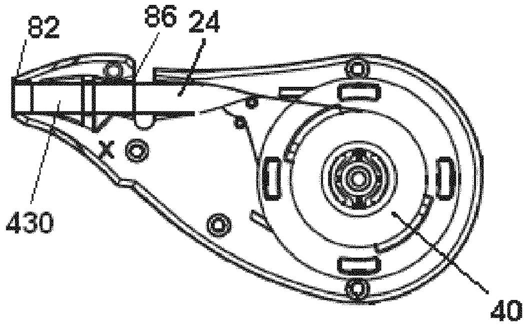
FIG. 19 shows a top view of the bottom casing of the horizontal tape dispenser device with the supply and the take up spools thereon.
Figure 20:
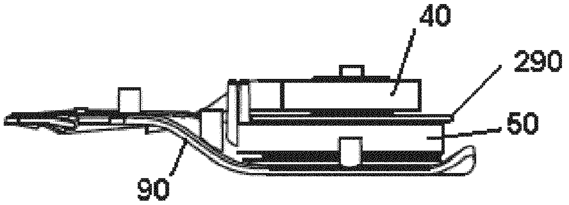
FIG. 20 shows a left side view of the bottom casing of the horizontal tape dispenser device with the supply and the take up spools thereon.
Figure 21:
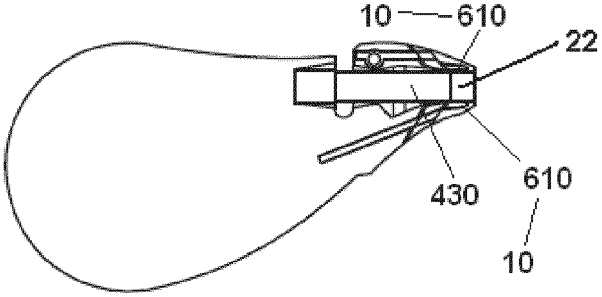
FIG. 21 shows a bottom view of the bottom casing of the horizontal correction tape dispenser device with the tape thereon.

Referring now to FIGS. 9 and 17, the application portion (60) comprises an applicator head (80). As shown in FIGS. 15 and 19, the applicator tip (120) is disposed at the first end (82) of the applicator head (80). The applicator tip (120) is arranged substantially perpendicular to the spool shaft (310).

Referring to FIGS. 9 to 11, and 17, the application portion (60), the slit (110) and the slant (90) are formed on the base (180). Referring to FIGS. 9 & 17, the application portion (60) begins from the applicator tip (120) and ends where the base (180) starts to slant downwards at the front edge (410), whereas the slant (90) begins from the front edge (410) of the application portion (60) and ends at where the spool portion (130) begins. Referring now to FIGS. 10, 15 17, and 20, the application portion (60) is formed in a substantially elongated flat shape occupying substantially a single plane (140). The single plane (140) is substantially flat and thin. The single plane (140) lies substantially on a horizontal plane. With reference again to FIG. 17, the single plane (140) is located perpendicular to the spool shaft (310). Referring now to FIGS. 9, 10, 15, and 17, the slant (90) bends downwards from the front edge (414) of the application portion (60) to the front end (420) of the spool portion (130). The slant (90) occupies substantially a horizontal length (340) as shown in FIG. 17.

Figure 14:
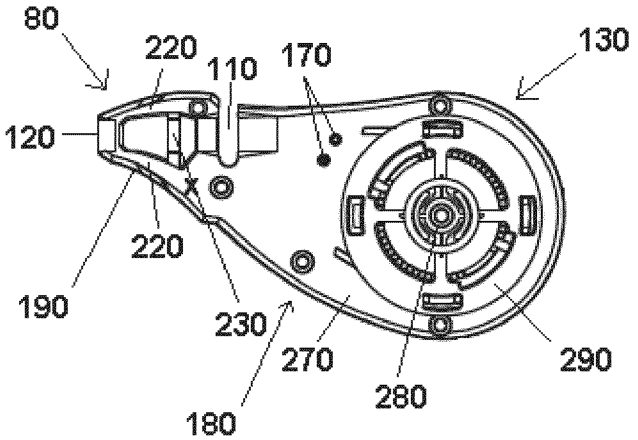
FIG. 14 shows a top view of the bottom casing of the horizontal correction tape dispenser device with the spool frame and the core.

Referring now to FIGS. 9, 11, 12, 14, 16, 17, and 19, the slit (110) is formed at the rear portion (84) of the application portion (60). Specifically, with reference to FIG. 19, the slit (110) is formed at the second end (86) of the applicator head (80). Referring further to FIG. 14, the slit (110) is aligned along the lengthwise axis of the applicator head (80) on the same single plane (140) with the applicator tip (120).

Referring now to FIGS. 9 and 17 to 21, the application portion (60) is for allowing the tape (20) to travel around the application portion (60) substantially on a single plane (140) and guiding the tape (20). With further reference to FIG. 4 again, the supply side (160) of the tape (20) is disposed at the outer side thereof when traveling around the applicator head (80).

Referring still to FIGS. 9, and 18 to 21, the slit (110) is adapted for guiding the tape (20) and at the same time, allowing the supply tape (22) to pass through. The slit (110) together with the applicator head (80) guides the tape (20) towards the applicator tip (120). However, it is allowed that the slit (110) is an optional feature such that the tape guiding mechanism (10) is able to provide its function without the slit (110).

Figure 27:
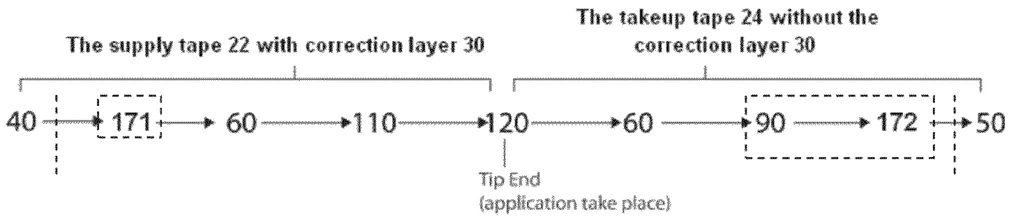
FIG. 27 shows the tape traveling sequence of the present invention.

Referring still to FIGS. 9, and 17 to 21, the slant (90) is adapted for guiding the tape (20). With further reference to FIG. 27, The slant (90) is adapted for guiding the take up tape (24) to travel from the application portion (60) to the take up spool (50). Optionally, the slant (90) is also allowed for guiding the supply tape (22) from the supply spool (40) to the application portion (60). The slant (90) is further adapted for providing the spool portion (130) to locate the spools (40) & (50) such that the single plane (140) of the application portion (60) is substantially aligned with the plane (150) between the spools (40) & (50). The tape (20) traveling along the application portion (60) substantially in the single plane (140) which is aligned with the plane (150) between the spools (40) & (50) optimizes the guidance provided by the tape guiding mechanism (10). However, the tape guiding mechanism (10) is optionally able to provide its functions without the slant (90).

Referring again to FIGS. 9, and 17 to 21, the tape guiding mechanism (10) is further for guiding the tape (20) from the supply spool (40) to the application portion (60), along the application portion (60) towards the applicator tip (120) or optionally towards the slit (110), optionally through the slit (110), around the applicator tip (120), along the application portion (60) towards the take up spool (50) direction or optionally towards the slant (90), optionally along at least a portion of the slant (90), and back to the take up spool (50). The tape guiding mechanism (10) is further adapted for guiding and allowing the tape (20) to travel from the supply spool (40) to the application portion (60), along the application portion (60) on the single plane towards the applicator tip (120) or optionally towards the slit (110), optionally through the slit (110), around the applicator tip (120), along the application portion (60) on the single plane (140) towards the take up spool (50) direction or optionally towards the slant (90), optionally along at least a portion of the slant (90), and back to the take up spool (50) in a substantially tight manner. Further tape (20) traveling sequence is shown in FIG. 27. It is allowed in the present invention that the slant (90), the slit (110), the feature (171) & (173) (as will be hereinafter described), two of these features, or all of them are optional features. It is also allowed that any combination of at least two of these features (60), (80), (90), (110), (171), & (173) optionally including at least one of any other feature.

Referring to FIGS. 9, 17 to 21 and 27, the tape (20) travels from the supply spool (40) to the application portion (60), along the application portion (60) on the single plane towards the applicator tip (120) or optionally towards the slit (110), optionally through the slit (110), around the applicator tip (120), along the application portion (60) on the single plane (140) towards the take up spool (50) direction or optionally towards the slant (90), optionally along at least a portion of the slant (90), and back to the take up spool (50).

Figure 23:
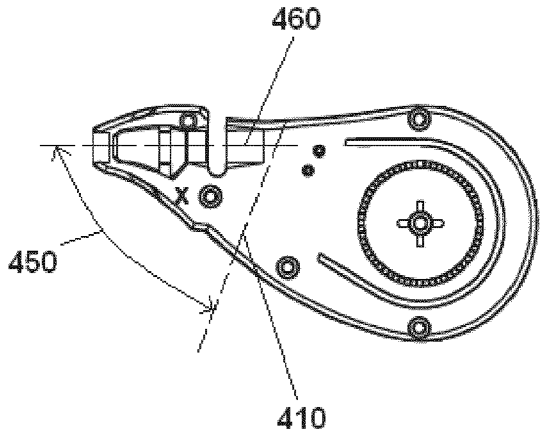
FIG. 23 shows the slant bending at an angle from the lengthwise axis of a tape traveling path on the application portion.

In addition, with reference to FIGS. 17, 18, and 23, the length, thickness, and the shape of the application portion (60), and the first and the second angles ((440)) & (450) and the horizontal length (340) of the slant (90) are sufficient for the tape guiding mechanism (10) to guide the tape (20) and prevent tape loosening.

Besides that, referring now to FIGS. 9 to 12, 14 to 15, and 27, the tape guiding mechanism (10) further comprises at least one guiding shaft (170) adapted for guiding the supply tape (22) from the supply spool (40) along the application portion (60) to the slit (110); and guiding the take up tape (24) from the slant (90) to the take up spool (50). The guiding shaft (170) is formed on the slant (90) substantially parallel to the spool shaft (310). According to one of the most preferred embodiments of the present invention, there are two guiding shafts (170) formed on the slant (90) as shown in FIGS. 9 to 12 and 14. Referring to FIGS. 9, 18 and 19, the supply tape (22) touches the outer shaft (171), whereas the take up tape (24) touches the inner shaft (173).

The tape guiding mechanism (10) further comprises at least one guiding shaft (170) for guiding the supply tape (22) from the supply spool (40) along the application portion (60) to the slit (110); and guiding the take up tape (24) from the slant (90) to the take up spool (50); and the at least one guiding shaft (170) is formed on the slant (90) substantially parallel to the axis of rotation of the spools (40) & (50). It should be noted that the tape guiding mechanism (10) is able to provide its functions optionally without the guiding shaft(s) (170).

Figure 24:
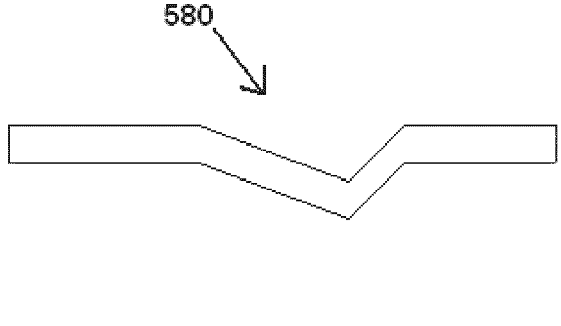
FIG. 24 shows the zigzag configuration that can be adopted by the lengthwise cross section of the application portion.

In addition, referring now to FIGS. 6, 9 to 11, 14, and 18, the application portion (60) comprises an application profile (190) that bends from side to side on the cross-section thereof along the lengthwise extent of the application portion (60). The application profile (190) is adapted for further guiding the tape (20) on the application portion (60), for providing flexibility for the applicator head (80), or both of these functions. The application profile (190) is preferably formed in a zig-zag profile as shown in FIGS. 6, 10, and 14. The lengthwise cross-section of the application profile (190) is also allowed to follow other configuration such as a curved or S-shaped configuration, a zigzag configuration (580) and other configurations as shown in FIG. 24. The tape guiding mechanism (10) is able to provide its functions optionally without the application profile (190).

Referring now to FIGS. 6, 9, 11 to 15, and 18, the applicator head (80) also further comprises a cut-out section (210), a dual spines (220) defining the cut-out section (210) in between, and a bridge (230) connected between the dual spines (220) across the cut-out section (210). Referring now to FIGS. 9 & 15, the bridge (230) is substantially protruded upwards from the application portion (60). The bridge (230) is adapted for guiding the tape (20) on the applicator head (80). The tape guiding mechanism (10) is able to provide its functions optionally without the bridge (230).

Figure 13:
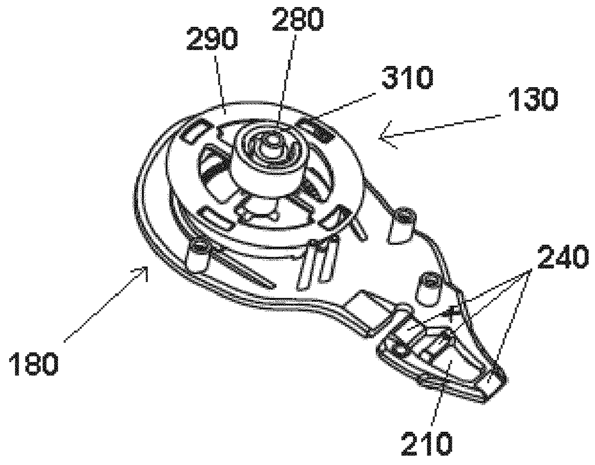
FIG. 13 shows a perspective view of the bottom casing of the horizontal correction tape dispenser device with the spool frame and the core.
Figure 16:
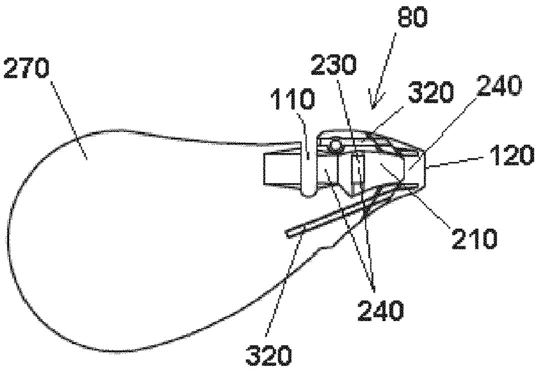
FIG. 16 shows a bottom view of the bottom casing of the horizontal correction tape dispenser device without the tape thereon.
Figure 26:
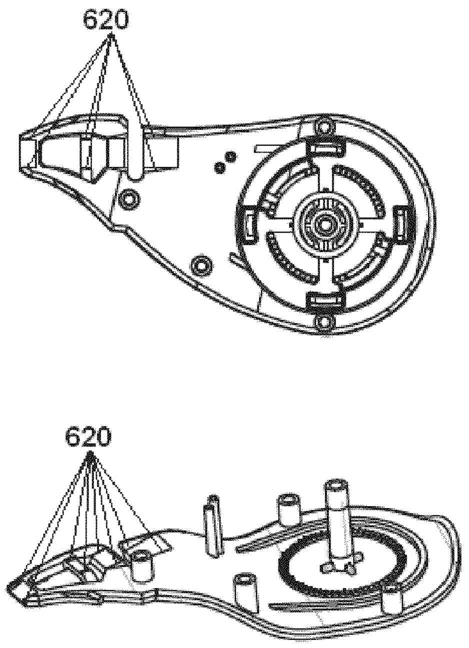
FIG. 26 shows the tape guiding member of the present invention.

Referring now to FIGS. 9, 18, 21 & 26, the application portion (60) further comprises a tape guiding member (610) & (620). With further reference to FIGS. 12, 13 and 16, the tape guiding member (610) & (620) forms a tape guiding groove (240). As further shown in FIG. 21, there is shown the tape guiding member (610) as ribs. As shown in FIG. 26, there is shown the tape guiding member (620) as guiding walls (620). With reference to FIGS. 9, 12, 13, 18, 21, and 26, the tape guiding groove (240) is formed along a tape-traveling path (430) along the application portion (60). The tape guiding groove (240) is also adapted for guiding the tape (20) traveling along the application portion (60). The tape guiding mechanism (10) is able to provide its functions optionally without the tape guiding member (610) & (620), tape guiding groove (240).

Referring now to FIGS. 17 and 18, the application portion (60) is substantially of a predetermined length and of a predetermined thickness. The slant (90) bends downwards substantially at a predetermined first angle ((440)). With reference now to FIGS. 9, 15, 21, and 23, the front edge (410) of the slant (90) makes a predetermined second angle (450) from the lengthwise axis (460) of the tape traveling path (430) on the application portion (60). The slant (90) occupies substantially a predetermined horizontal length (340) as shown in FIG. 17. The length, thickness, and the shape of the application portion (60), and the first and second angles ((440)) & (450) and the horizontal length of the slant (90) are sufficient for pulling the tape (20) substantially towards the spool direction such that the tape (20) travels around the application portion (60) in the single plane (140) in a substantially flat and tight manner. With reference still to FIG. 17, the application portion (60) is also substantially of a length that is sufficient for the tape guiding mechanism (10) to guide the tape (20) and prevent tape loosening. Referring now to FIG. 17, the single plane (140) is substantially of a length substantially in the range of from $2.5\times10^{-2}$ m to $3.5\times10^{-2}$ m and of a thickness substantially in the range of $5.0\times10^{-4}$ m to $3.0\times10^{-3}$ m.

Referring still to FIGS. 17 and 18, the slant (90) bends downwards substantially at a first angle ((440)) that is sufficient for the tape guiding mechanism (10) to guide the tape (20) and prevent tape loosening preferably substantially in the range of from 30° to 48° from the horizontal plane. Next, with reference again to FIG. 17, the slant (90) also occupies substantially a horizontal length (340) that is sufficient for the tape guiding mechanism (10) to guide the tape (20) and prevent tape loosening substantially in the range of $5.0\times10^{-3}$ m to $1.5\times10^{-2}$ m.

Figure 25:
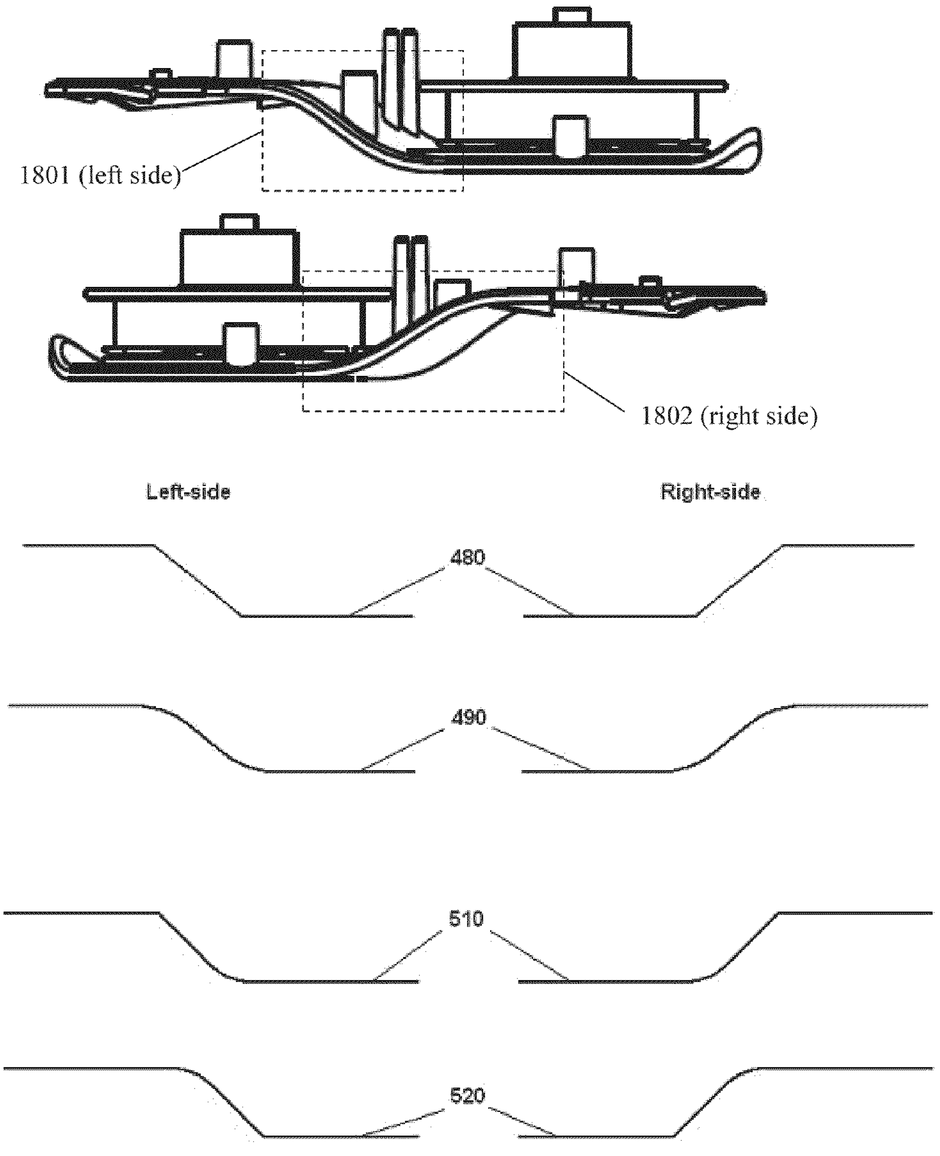
FIG. 25 shows the zigzag configuration, the curved configuration, and other configurations that can be adopted by the lengthwise cross-section of the bottom casing.

Referring to FIG. 25, the lengthwise cross section of the left side (1801) and the right side (1802) on the base where the application portion (60) bends into the slant (90) and the slant (90) turns into the spool portion (130) is also allowed to follow other configuration such as a curved or S-shaped configuration (490), a zigzag configuration (480) and other configurations (510) & (520).

Whilst the applicator head (80) is shown here to be a unitary body with the base (180), it is appreciated that it can also apply to detachable applicator head (80). Furthermore, it is also appreciated that it can apply to applicator head that is detachably connected to the base (180).

Figure 28:
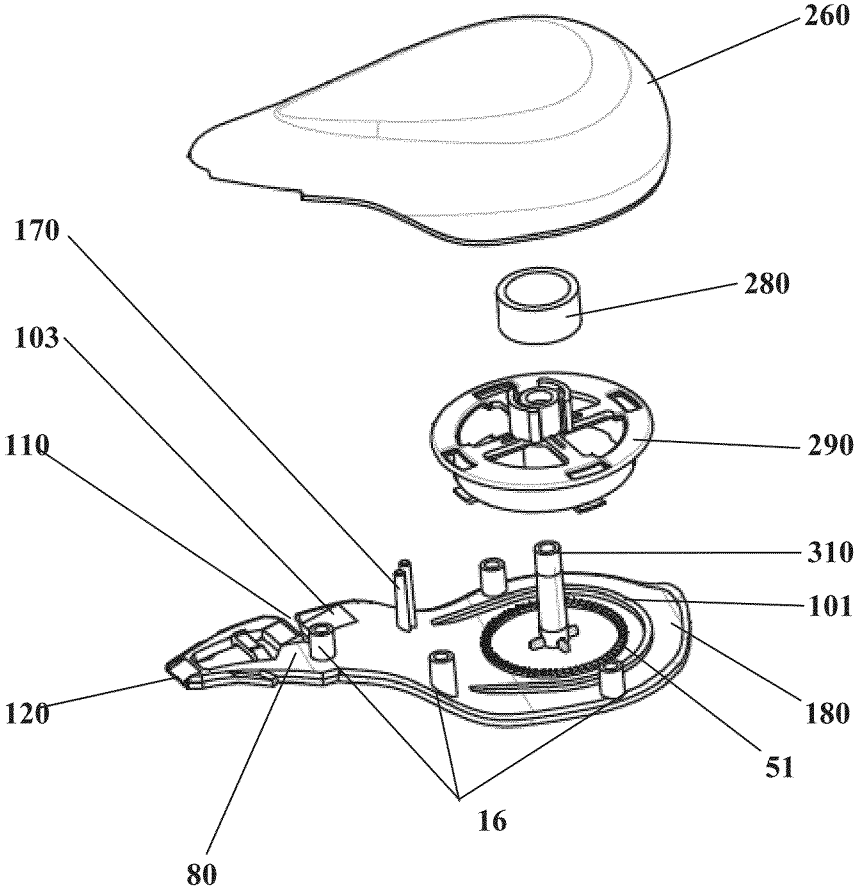
FIG. 28 shows an exploded view of the preferred embodiment.

Referring to FIG. 28, the base (180), and the applicator or applicator head (80) are combined to form a single entity with a slit (110) between said base (180) and said applicator head (80) for providing a passage for the correction tape. Said plurality of connectors (16) is preferably integrated into the base (180) and the cover or top casing (260) for providing locking means, and the retainer, also known as the spool shaft (310), in the present invention preferably characterized by a shaft extending upwards from the base, receives a correction tape spool, in which the correction tape spool comprises a take-up spool (50) and a supply spool (40).

Besides these main elements, the correction tape dispenser preferably has a ratchet (51) around the spool shaft (310) to provide irreversible movement, and preferably has guide means for providing alignment between the correction tape spool and the applicator tip (120) of the applicator head (80). This guide means is described as a rail (101) around the ratchet (51) to provide rotational guided movement of the correction tape spool, a vertical guide, or the guiding shaft (170) aligned from the rail (101) towards the applicator tip (120) of the applicator head (80) for providing alignment of a correction tape, and a horizontal guide (103) identified as a slope before a correction tape enters the slit (110) between the base (180) and the applicator head (80) for guiding the correction tape to exit through the slit (110) to allow said correction tape to wind around the applicator tip (120).

Figure 29:
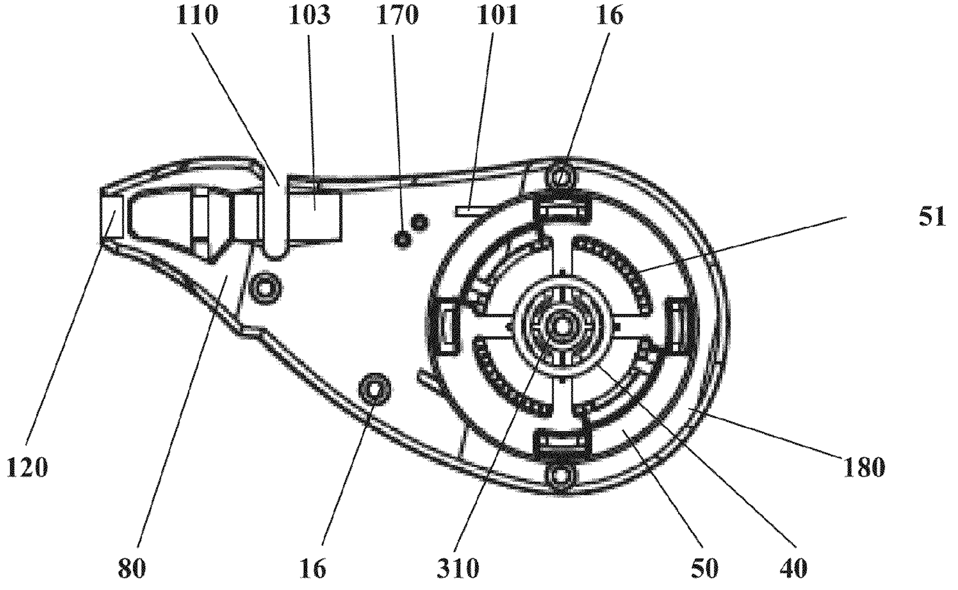
FIG. 29 shows the top view of the present invention.

Referring to FIG. 29, there is illustrated a top view of the present invention, where the figure clearly illustrates the direction and position of the guide means in effective working relationship with each other. As stated previously, the rail (101) as a rotational movement guide to the correction tape spool, is aligned in such a way that a correction tape dispensed from the supply spool 40 will be guided through the guiding shaft (170) characterized by a pair of shafts extending upwards from the base (180) close to the rail (101), and twisted at a right angle before directing the correction tape through the slit (110) with the aid of said horizontal guide (103). An empty tape will then wind around the tip (120) of the applicator head (80) after transferring the correction tape onto a surface, and return to the take-up spool (50).

Figure 30:
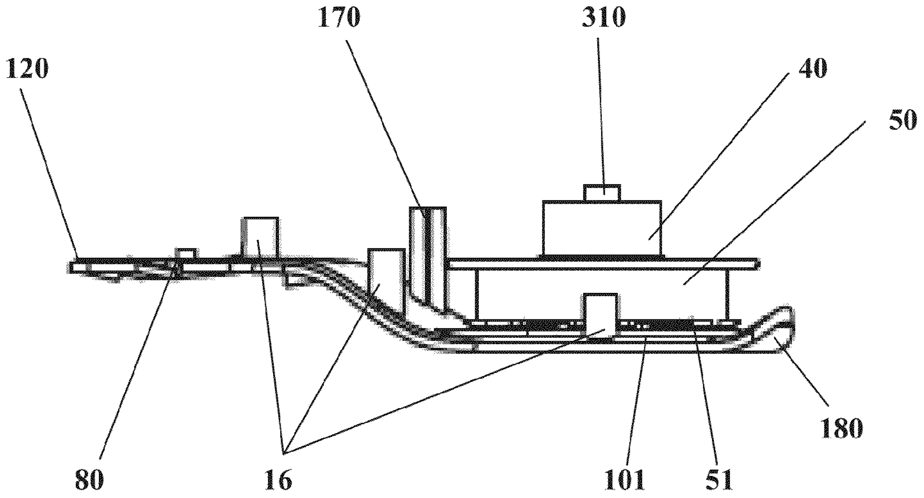
FIG. 30 shows the side view of the present invention.

Referring to FIG. 30, there is illustrated a side view of the preferred embodiment. The figure shows a take-up spool (50) engaging with the ratchet (51) to prevent the correction tape spool from rotating in the opposite direction. It is also shown that the supply spool (40), where a correction tape originates, is positioned in an accommodating length and height from the applicator tip (120) of the applicator head (80), with the intention that the correction tape perfectly envelopes the applicator head (80) with an effective strip tension.

Being optionally able to withstand a pressing weight of at least 1.5 kg to at most 5 kg at the applicator tip (120) of the applicator head (80), the materials used to manufacture the preferred embodiment are chosen to be any group of polymer materials, preferably Polypropylene, and Polyamides because manufacturing process in the present invention is carried out using injection moulding, that would greatly influence shrinkage values of the materials used. However, other non-limiting materials also can be used to manufacture this preferred embodiment, preferably with the range of effective material tensile strengths of 28 Mpa to 83 Mpa, as well as preferably ductile and elastic, to provide adequate flexibility of the present invention. In order to sufficiently provide flexibility to the applicator tip (120), the applicator head (80) is optionally able to withstand a pressing weight of at least 1.5 kg to at most 5 kg at the applicator tip (120) thereof. As for further strengthening the applicator head (80) from any breakage since taking the level of inclination into consideration, bottom of the applicator head (80) is preferably ribbed to provide additional strength and support.

Figure 31:
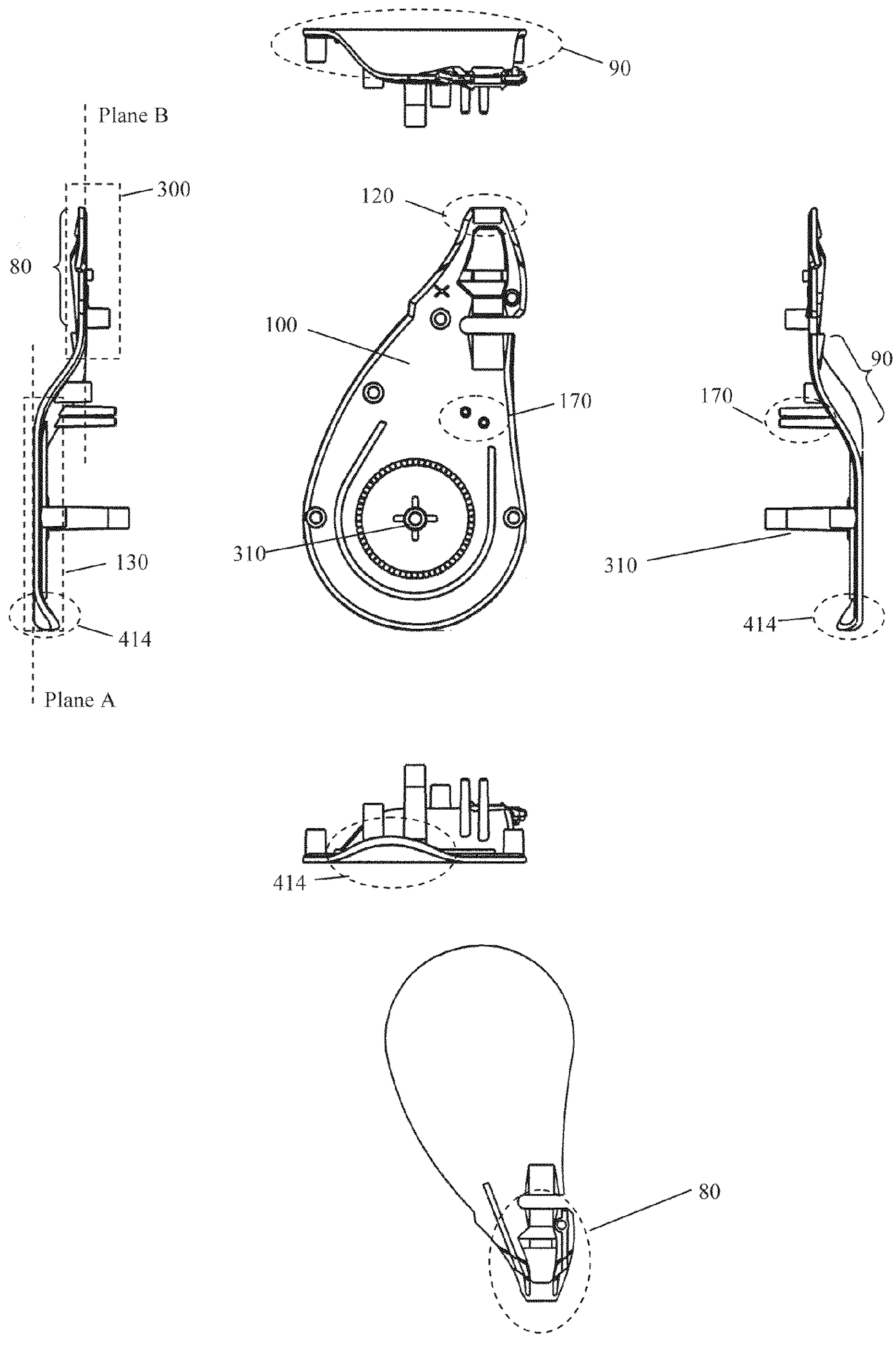
FIG. 31 shows chassis of the correction tape dispenser device.

Referring to FIG. 31, the chassis or base (180) of a correction device for dispensing tape from a reel comprising the applicator tip (120), the spool shaft (310), the tape guide, vertical guide or guiding shafts (170) may be integrated as a unibody or separable from the base (180). Previous constructions have the dispensing head separable from the chassis of the correction device along with other components. The applicator tip (120) may be flexible to allow the applicator tip (120) to handle the pressure asserted upon the applicator tip (120) during use.

The spool shaft (310) holds the supply spool and the take up spool in position during operation, thus providing a pivot for the supply spool and the take up spool to rotate while preventing the reel from moving of position.

The base (180) is designed with a surface profile that provides an "in-shape" contour for a left and right handed user. The curve or the slant (90) lies between the applicator tip (120) and the spool shaft (310) provides a built in ergonomic feature that provides a location for the user to rest at least a finger during use. This in turn guides the fingers of the use to be positioned for a preferred hold to comfortably use the correction device.

As mentioned before, the effective inclination angle of the slant (90) may lie between 30 degrees and 48 degrees from the plane of the base platform or spool portion (130) of the base (180).

The slant (90) provides a raised platform (300) so that the contact plane between the supply spool (40) and the take up spool (50) is aligned with the applicator tip (120).

Figure 32:
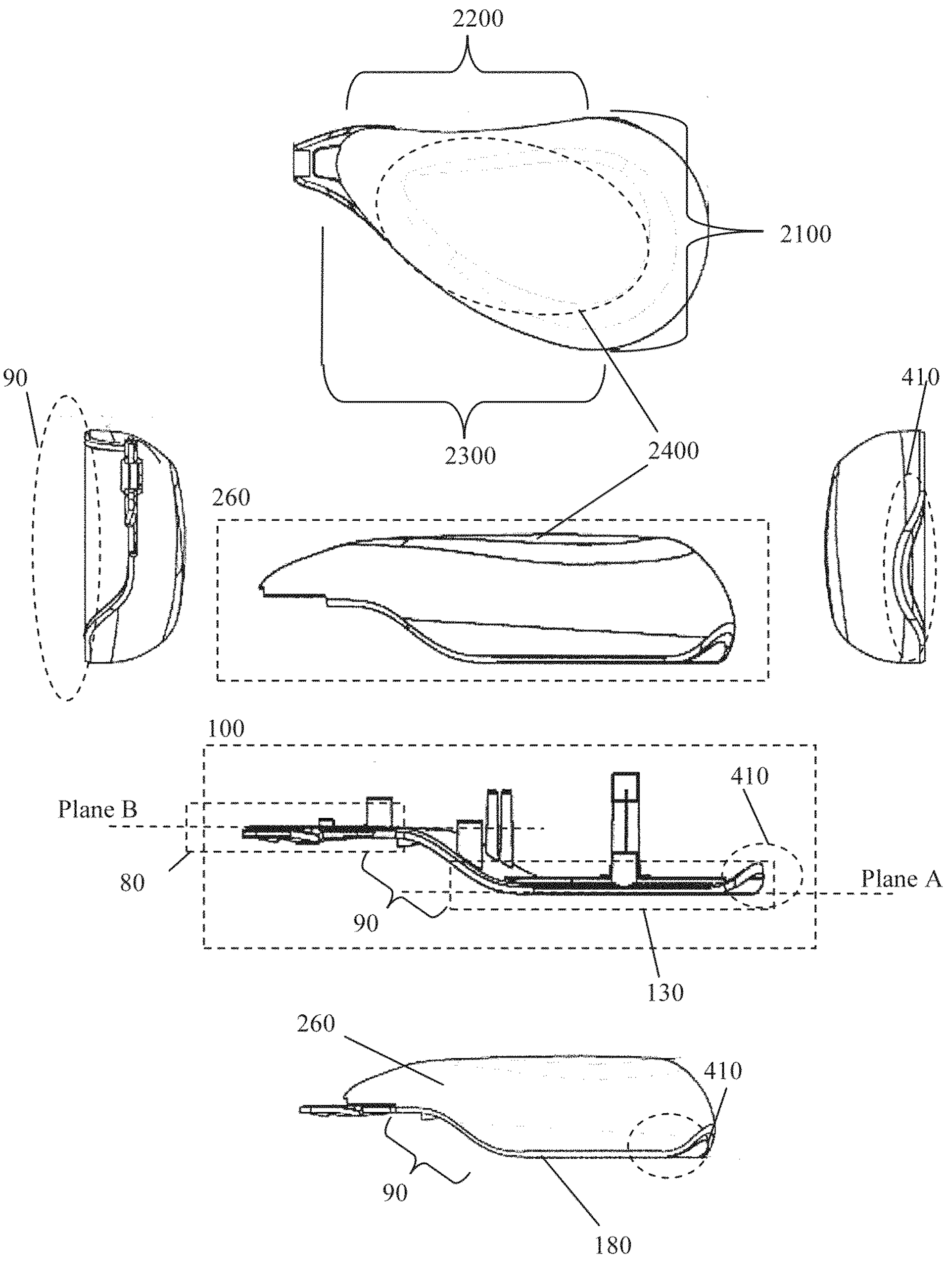
FIG. 32 shows the overall body structure of the correction tape dispenser device.
Figure 33:
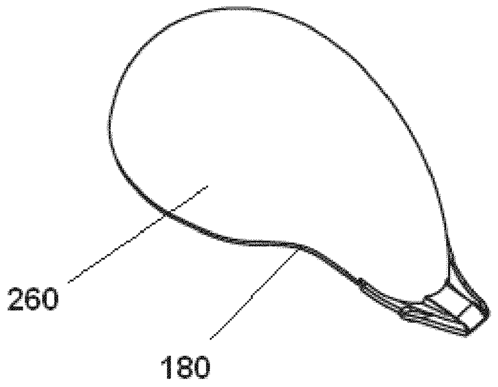
FIG. 33 shows a perspective view of the correction tape dispenser device.
Figure 34:
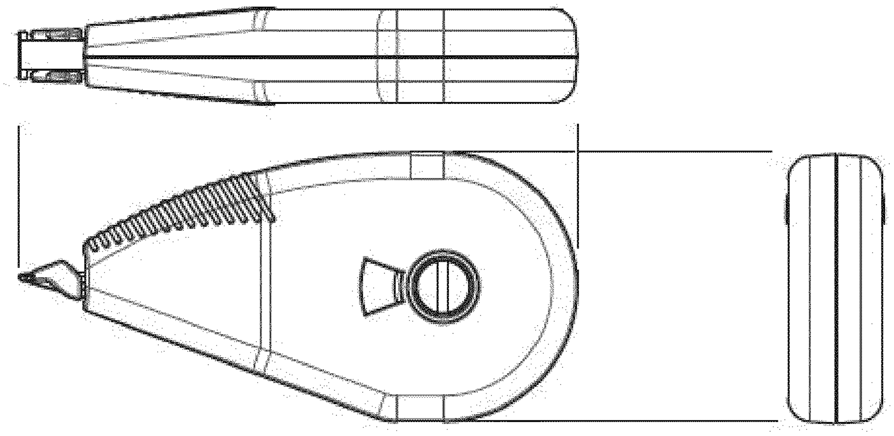
FIG. 34 shows a prior art that was used in a drop test.

Referring to FIGS. 32 & 33, as with the base (180), the top casing (260) is shaped with a surface profile that provides an "in-shape" contour for a left and right-handed user. The contour has a relatively flat top (2400) with rounded edges and curved sides. The flat top (2400) provides a platform for a thumb to rest, thus guiding the thumb into a preferred position for a comfortable hold. The shape of the top casing (260) provides a holding grip for the hands of left and right handed users. For purpose of referencing, the curves sides may be divided into sections comprising, a rear curve section (2100), a minor curve section (2200), and a major curve section (2300). The sections (2100, 2200, 2300) guide the fingers into a preferred position.

The rear of the base (180), also known as the rear end (414) may be angled upwards from the plane of the base platform of the base (180) to provide a rest support for the hand of the user. When combined with the top casing (260), the angled rear (414) reduces exposure to sharp edges, thus providing a safe and comfortable grip.

As the thumb rests on the flat top (2400) the index finger may be naturally guided to wrap around the rear curve section (2100) and around the minor curve section (2200) for a right handed user or around the major curve section (2300) for a left handed user. Together with the slant (90) laid between plane A and B to guide the middle finger into location to support the correction device, the user is naturally guided into a preferred manner of holding the correction tape device (100) for comfort.

Figure 35:
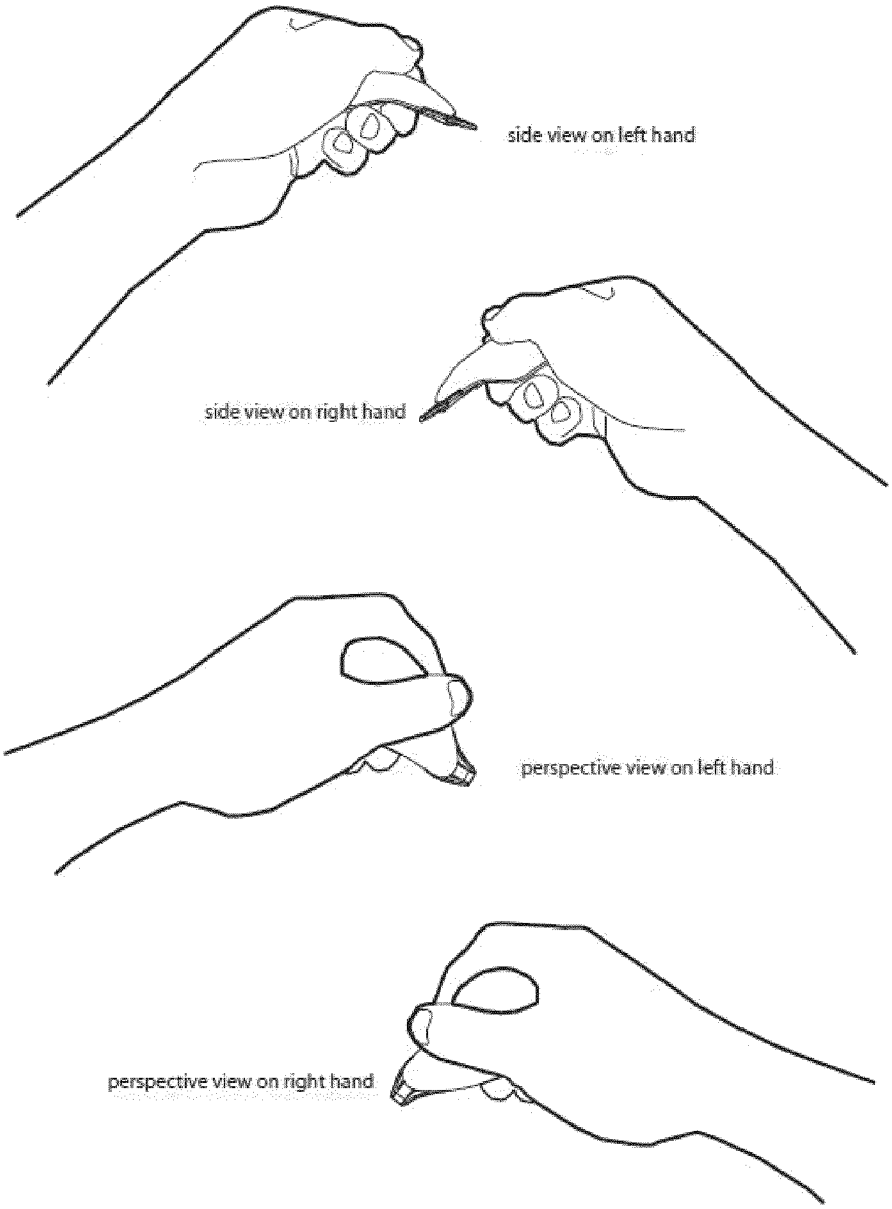
FIG. 35 shows the exemplary orientations to hold the correction tape dispenser device.

Having the correction tape device (100) shaped to guide a user's hand to hold the correction device in a preferred position reduces fatigue, discomfort and injury to the user due to improper grip or hold is reduced. FIG. 35 shows the exemplary orientations to hold the correction device during use.

The supports for the applicator tip (120) may be in a zig zag shape to provide a strong flexible support. Compared to a straight support beam that is rigid, a zig zag support beam allows the support to flex to adapt to varying pressures applied to the applicator tip (120) during use, as will be hereinafter described in greater detail.

The base (180) and the top casing (260) are assembled in a way that the base (180) is embedded in the top casing (260) so that the parting line is shifted to the bottom side of the correction device.

This assembly allows the (180) to be flushed with the top casing (260). The parting line is one of the main factors that bare the risk of failing a drop test. By shifting the parting line to the bottom of the correction device, the correction device may be more resilient to impacts when dropped. The correction device does not easily break into pieces because of the drop. In addition, referring to FIGS. 1 to 3 and 5, the structure of the correction device of the present invention is also more resilient to impacts when dropped. The correction device does not easily break into pieces because of the drop. Particularly, the base (180) does not easily break apart from the top casing (260) because of a drop. Examples of drop tests and their results are given as follows:

The Drop Test 1 (Invention)

This drop test was tested on the correction tape device (100) of the present invention as shown in FIGS. 31 to 33.

1.0 Document Introduction

This document describes the way drop test is conducted; it includes the test equipment, the test condition, and the test procedure.

1.1 Table of Testing Summary

| No | Test description | Test methods |
|---|---|---|
| 1 | Finished goods cross matching drop test. | Applicator tip up<br>Applicator tip down<br>Side up<br>Side down<br>Top up<br>Bottom down<br>Total = 6 drops |

2.0 Test Equipment:

a. 2.5 mm rubber pad.

3.0 Test Condition:

a Drop Height: 100 cm b. Drop Sequences: 6 drops/1 product c. Weight (Packaged 1 set): 13.11 grams.

e. Total Quantity: 64 sets (cross matching casings)

4.0 Testing Result with 100 cm Drop Height

TABLE 1

| no | Applicator Tip Up | Applicator Tip Down | Side Up | Side Down | Top Up | Bottom Up | Remarks |
|---|---|---|---|---|---|---|---|
| 1-1 | Pass | Pass | Pass | Pass | Pass | Pass | |
| 1-2 | Pass | Pass | Pass | Pass | Pass | Pass | |
| 1-3 | Pass | Pass | Pass | Pass | Pass | Pass | |
| 1-4 | Pass | Pass | Pass | Pass | Pass | Pass | |
| 1-5 | Pass | Pass | Pass | Pass | Pass | Pass | |
| 1-6 | Pass | Pass | Pass | Pass | Pass | Pass | |
| 1-7 | Pass | Pass | Pass | Pass | Pass | Pass | |

TABLE 1-continued

| no | Applicator Tip Up | Applicator Tip Down | Side Up | Side Down | Top Up | Bottom Up | Remarks |
|---|---|---|---|---|---|---|---|
| 1-8 | Pass | Pass | Pass | Pass | Pass | Pass | |
| 2-1 | Pass | Pass | Pass | Pass | Pass | Pass | |
| 2-2 | Pass | Pass | Pass | Pass | Pass | Pass | |
| 2-3 | Pass | Pass | Pass | Pass | Pass | Pass | |
| 2-4 | Pass | Pass | Pass | Pass | Pass | Pass | |
| 2-5 | Pass | Pass | Pass | Pass | Pass | Pass | |
| 2-6 | Pass | Pass | Pass | Pass | Pass | Pass | |
| 2-7 | Pass | Pass | Pass | Pass | Pass | Pass | |
| 2-8 | Pass | Pass | Pass | Pass | Pass | Pass | |
| 3-1 | Pass | Pass | Pass | Pass | Pass | Pass | |
| 3-2 | Pass | Pass | Pass | Pass | Pass | Pass | |
| 3-3 | Pass | Pass | Pass | Pass | Pass | Pass | |
| 3-4 | Pass | Pass | Pass | Pass | Pass | Pass | |
| 3-5 | Pass | Pass | Pass | Pass | Pass | Pass | |
| 3-6 | Pass | Pass | Pass | Pass | Pass | Failed | |
| 3-7 | Pass | Pass | Pass | Pass | Pass | Pass | |
| 3-8 | Pass | Pass | Pass | Pass | Pass | Pass | |
| 4-1 | Pass | Pass | Pass | Pass | Pass | Pass | |
| 4-2 | Pass | Pass | Pass | Pass | Pass | Pass | |
| 4-3 | Pass | Pass | Pass | Pass | Pass | Pass | |
| 4-4 | Pass | Pass | Pass | Pass | Pass | Pass | |
| 4-5 | Pass | Pass | Pass | Pass | Pass | Pass | |
| 4-6 | Pass | Pass | Pass | Pass | Pass | Pass | |
| 4-7 | Pass | Pass | Pass | Pass | Pass | Pass | |
| 4-8 | Pass | Pass | Pass | Pass | Pass | Pass | |
| 5-1 | Pass | Pass | Pass | Pass | Pass | Pass | |
| 5-2 | Pass | Pass | Pass | Pass | Pass | Pass | |
| 5-3 | Pass | Pass | Pass | Pass | Pass | Pass | |
| 5-4 | Pass | Pass | Pass | Pass | Pass | Pass | |
| 5-5 | Pass | Pass | Pass | Pass | Pass | Pass | |
| 5-6 | Pass | Pass | Pass | Pass | Pass | Pass | |
| 5-7 | Pass | Pass | Pass | Pass | Pass | Pass | |
| 5-8 | Pass | Pass | Pass | Pass | Pass | Pass | |
| 6-1 | Pass | Pass | Pass | Pass | Pass | Pass | |
| 6-2 | Pass | Pass | Pass | Pass | Pass | Pass | |
| 6-3 | Pass | Pass | Pass | Pass | Pass | Pass | |
| 6-4 | Pass | Pass | Pass | Pass | Pass | Pass | |
| 6-5 | Pass | Pass | Pass | Pass | Pass | Pass | |
| 6-6 | Pass | Pass | Pass | Pass | Pass | Pass | |
| 6-7 | Pass | Pass | Pass | Pass | Pass | Pass | |
| 6-8 | Pass | Pass | Pass | Pass | Pass | Pass | |
| 7-1 | Pass | Pass | Pass | Pass | Pass | Pass | |
| 7-2 | Pass | Pass | Pass | Pass | Pass | Pass | |
| 7-3 | Pass | Pass | Pass | Pass | Pass | Pass | |
| 7-4 | Pass | Pass | Pass | Pass | Pass | Pass | |
| 7-5 | Pass | Pass | Pass | Pass | Pass | Pass | |
| 7-6 | Pass | Pass | Pass | Pass | Pass | Pass | |
| 7-7 | Pass | Pass | Pass | Pass | Pass | Pass | |
| 7-8 | Pass | Pass | Pass | Pass | Pass | Pass | |
| 8-1 | Pass | Pass | Pass | Pass | Pass | Pass | |
| 8-2 | Pass | Pass | Pass | Pass | Pass | Pass | |
| 8-3 | Pass | Pass | Pass | Pass | Pass | Pass | |
| 8-4 | Pass | Pass | Pass | Pass | Pass | Pass | |
| 8-5 | Pass | Pass | Pass | Pass | Pass | Pass | |
| 8-6 | Pass | Pass | Pass | Pass | Pass | Pass | |
| 8-7 | Pass | Pass | Pass | Pass | Pass | Pass | |
| 8-8 | Pass | Pass | Pass | Pass | Pass | Pass | |

4.1 Results Summary a. 1.6% of the total tested specimen's showing casing displacement of and above.

b. 98.4% of the total tested specimens still functional.

c. 0% of the total tested specimen is completely dismantled.

The Drop Test 2 (Prior Art)

The prior art used in this test is shown in FIG. 4.

2.0 Test Equipment:

a 2.5 mm rubber pad.

3.0 Test Condition:

a. Drop Height; 100 cm b. Drop Sequences: 6 drops/1 product c. Weight (Packaged 1 set): 17.98 grams e. Total Quantity: 15 sets (cross matching casings)

4.0 Testing Result with 100 cm Drop Height

TABLE 2

| no | Applicator Tip Up | Applicator Tip Down | Side Up | Side Down | Top Up | Bottom Up | Remarks |
|---|---|---|---|---|---|---|---|
| 1-1 | failed | failed | failed | failed | failed | failed | |
| 1-2 | passed | passed | passed | passed | passed | passed | |
| 1-3 | passed | passed | passed | passed | passed | failed | |
| 1-4 | passed | passed | passed | passed | passed | passed | |
| 2-1 | passed | passed | passed | passed | passed | passed | |
| 2-2 | passed | passed | passed | passed | passed | passed | |
| 2-3 | passed | passed | passed | passed | passed | passed | |
| 2-4 | failed | failed | failed | failed | failed | failed | |
| 3-1 | passed | passed | passed | failed | failed | failed | |
| 3-2 | failed | failed | failed | failed | failed | failed | |
| 3-3 | passed | passed | passed | passed | passed | passed | |
| 3-4 | passed | passed | failed | failed | failed | failed | |
| 4-1 | failed | failed | failed | failed | failed | failed | |
| 4-2 | passed | passed | passed | passed | passed | passed | |
| 4-3 | failed | failed | failed | failed | failed | failed | |
| 4-4 | passed | failed | failed | failed | failed | failed | |

4.1 Results Summary a. 6.25% of the total tested specimen showing casing displacement of 1 mm and above.

b. 43.75% of the total tested specimen still functional.

c. 50% of the total tested specimens are completely dismantled.

Figure 36:
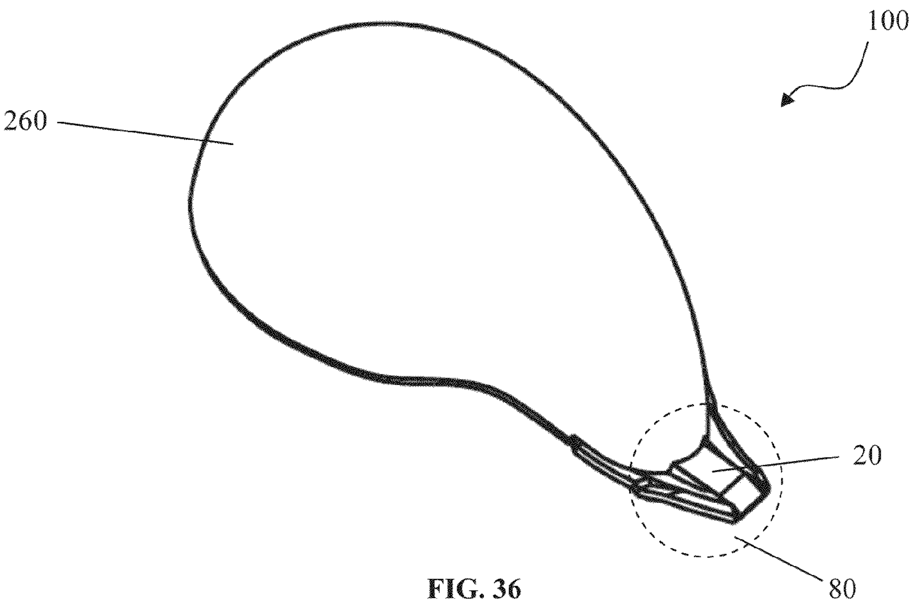
FIG. 36 shows a perspective view of a horizontal correction tape dispenser in accordance with the present invention.
Figure 37:
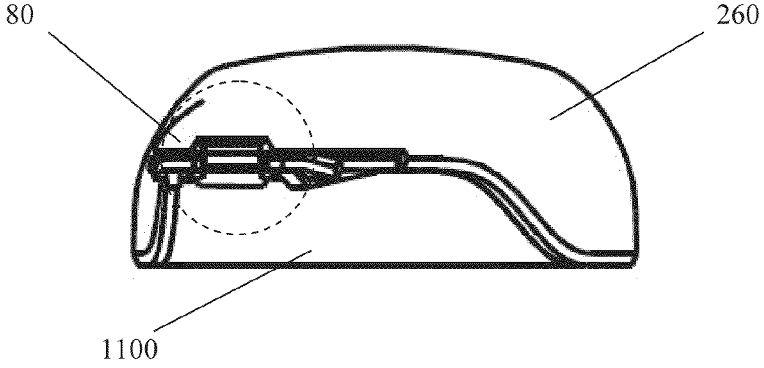
FIG. 37 shows a front view of a horizontal correction tape dispenser in accordance with the present invention.
Figure 38:
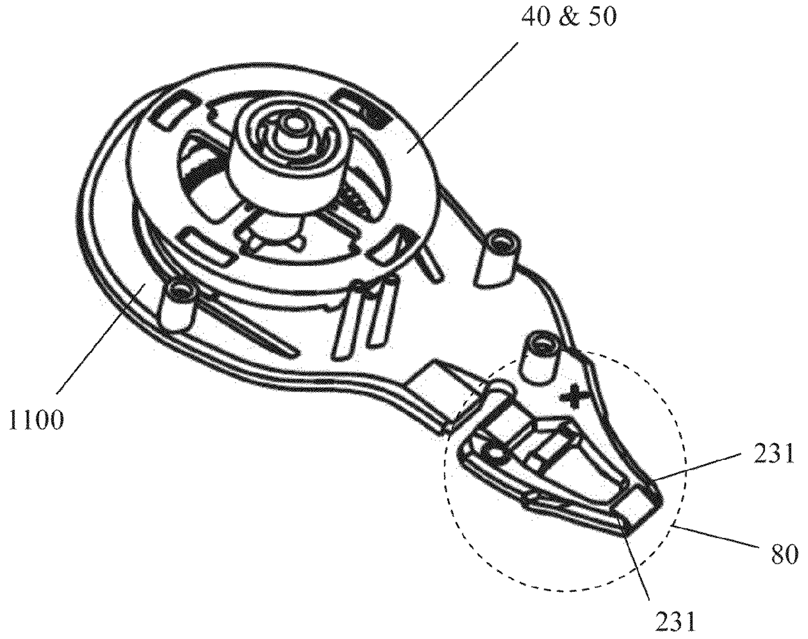
FIG. 38 shows a perspective view of a horizontal correction tape dispenser without the cover in accordance with the present invention.

Referring to FIGS. 36, 37, and 38, the basic structure of the horizontal correction tape device (100) for applying the correction tape (20), such as an opaque masking adhesive layer to a surface for covering clerical errors from handwriting and typewriting on papers as well as to touch up paperwork will be explained in the following.

The horizontal correction tape device (100) comprises a housing for containing a correction tape supply and take up reel or spool (40) & (50). The housing is divided into two parts, namely a body or housing (1100) for accommodating the correction tape supply and take up reel (40) & (50), and a cover or top casing (260) fastened on the body (1100) for covering the correction tape supply and take up reel (40) & (50). An applicator head (80) is attached to the front end of the body (1100) for guiding the correction tape (20). The applicator head (80) is designed in such a way that it occupies a single plane to reduce the complexity of manufacturing the same. In other words, most of the major components of the applicator head (80) are positioned horizontally on the same plane as the applicator head (80) and therefore, it requires fewer moulds to produce the said applicator head (80). Also, the applicator head (80) is preferably but not limited to permanently attached to the front end of the body (1100).

Figure 39:
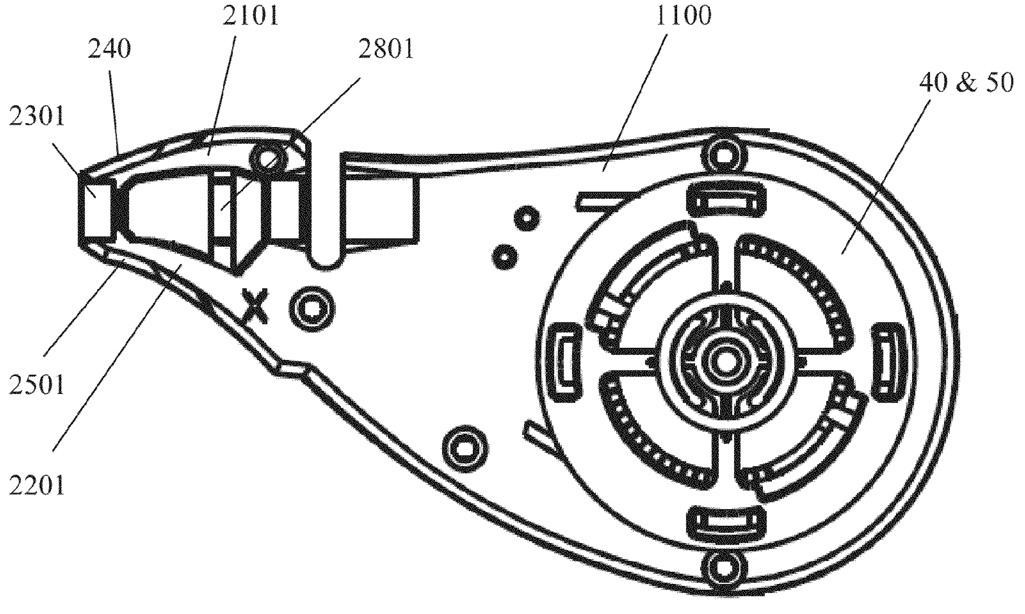
FIG. 39 shows a top view of a horizontal correction tape dispenser without the cover in accordance with the present invention.
Figure 44:
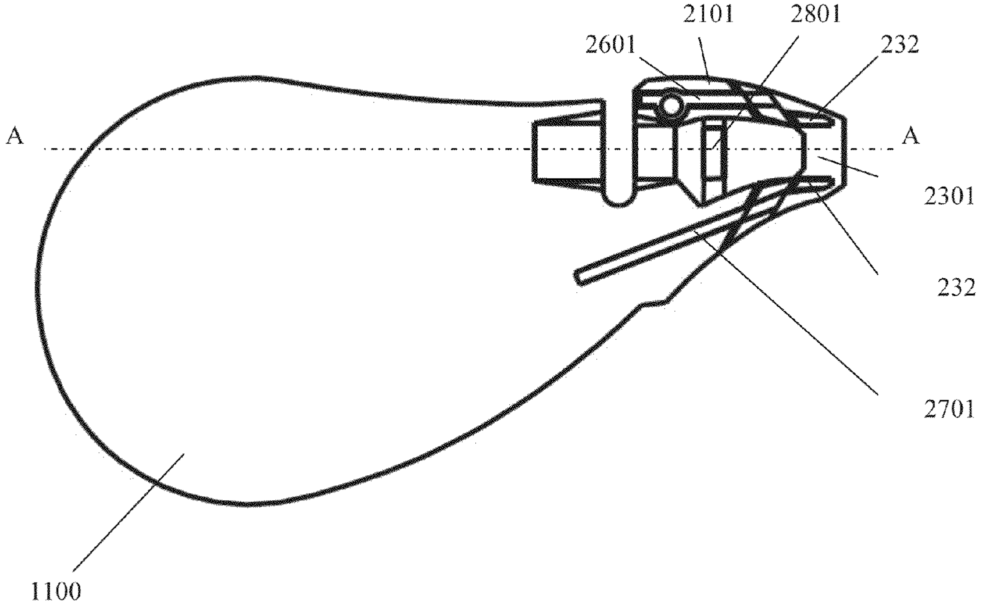
FIG. 44 shows a bottom view of a horizontal correction tape dispenser without the cover in accordance with the present invention.

Referring to FIGS. 38, 39, and 44, it is shown that the applicator head (80) is partially attached to the front portion of the body (1100). The technical features of the present invention are characterized in that the applicator head (80) comprises a first vertical supporting means (2101), a second vertical supporting means (2201), and a guiding means (2301) attached in between the front end of said first vertical supporting means (2101) and front end of said second vertical supporting means (2201). Due to the low frictional force between the correction tape (20) and the guiding means (2301), the correction tape (20) tends to evade from the applicator head (80) during the mode of operation. In order to prevent this and to give guidance to the correction tape (20), the guiding means (2301) is tapered towards the surface (not shown) with a pair of protruded side tips (231), (232) on the top and bottom surfaces for the purpose of guiding the correction tape and aligning the correction tape (20) with the applicator head (80) and guiding means (2301).

Referring to FIGS. 39 to 43, the applicator head (80) further comprises of a first notch-shaped ridge (2401) having a first bent angle (241) and a second bent angle (242) laterally attached to the side surface of the first vertical supporting means (2101), and a second notch-shaped ridge (2501) having a third bent angle (251) and a fourth bent angle (252) laterally attached to the side surface of the second vertical supporting means (2201). The first, second, third, and fourth bent angles are preferably but not limited to a range of 10°-16°, 58°-64°, 7°-13°, and 53°-59°, respectively. With this construction, the first and second vertical supporting means (2101), (2201) increases the flexibility of the applicator head (80). Furthermore, additional notch-shaped ridge can also be added to further improve the flexibility of the applicator head (80). Due to the high flexibility of the applicator head (80), the structural strength of the applicator head (80) is not able to compensate the pressing force exert by a user during operation. In order to prevent the applicator head (80) from breaking, the below embodiment teaches the method of increasing the structural strength.

Figure 40:
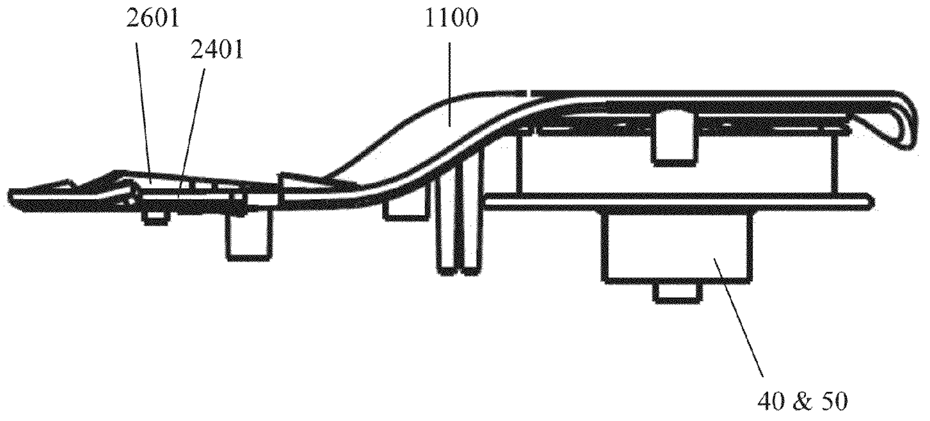
FIG. 40 shows a right side view of a horizontal correction tape dispenser without the cover in accordance with the present invention.
Figure 41:
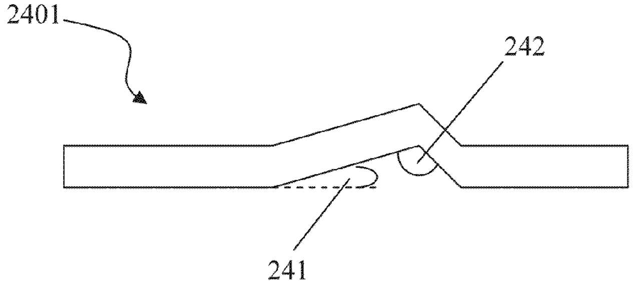
FIG. 41 shows the side view of the first notch-shaped ridge in accordance with the present invention.
Figure 42:
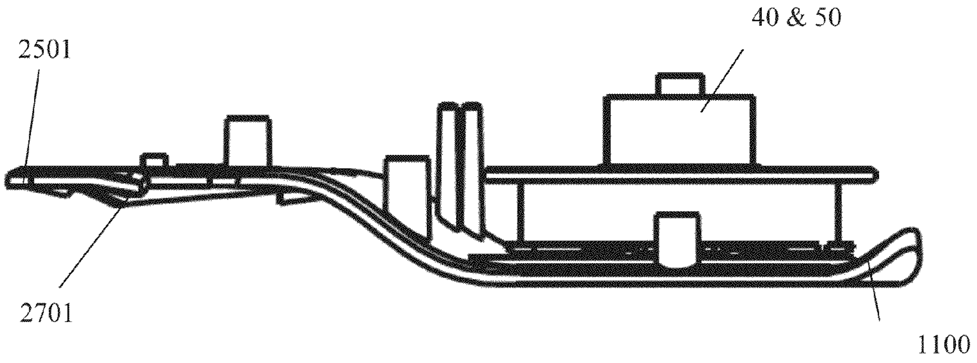
FIG. 42 shows a left side view of a horizontal correction tape dispenser without the cover in accordance with the present invention.
Figure 43:
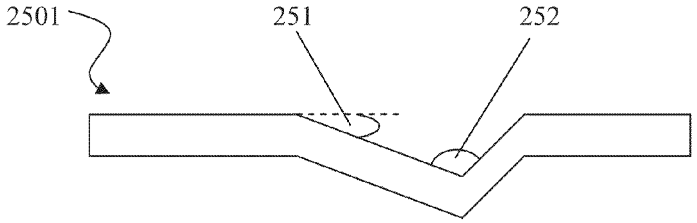
FIG. 43 shows the side view of the second notch-shaped ridge in accordance with the present invention.

Referring to FIGS. 40, 42, and 44, the applicator head (80) of the present invention further comprises a first bent ridge (2601) attached to the bottom surface of the first vertical supporting means (2101) and a second bent ridge (2701) attached to the bottom surface of the second vertical supporting means (2201). Both first and second bent ridges (2601), (2701) having front portion tapered towards the guiding means (2301). The first bent ridge (2601) is placed vertically parallel to the centerline A-A of the applicator head (80), whereas the second bent ridge (2701) is placed with an offset of between 2°-8°, preferably at 5° from the centerline A-A of the applicator head (80). Both first and second bent ridges (2601), (2701) increase the structural strength of the first and second vertical supporting means (2101), (2201) to compensate the pressing force acted on the applicator head (80).

Referring to FIGS. 39 and 44, the applicator head (80) comprises at least a horizontal supporting means (2801) attached to first vertical and second vertical supporting means (2101), (2201), more specifically, the horizontal supporting means (2801) is attached in between the front and back end of each of the said vertical supporting means (2101), (2201). The horizontal supporting means (2801) further comprises of a protruded tip extended upwards on both ends of the horizontal supporting means (2801) for guiding the correction tape (20) and preventing the evasion of the correction tape (20) from the applicator head (80). Also, the horizontal supporting means (2801) further acts as a stabilizing means to compensate the uneven pressing force exert by a user on the two vertical supporting means (2101), (2201).

Figure 45:
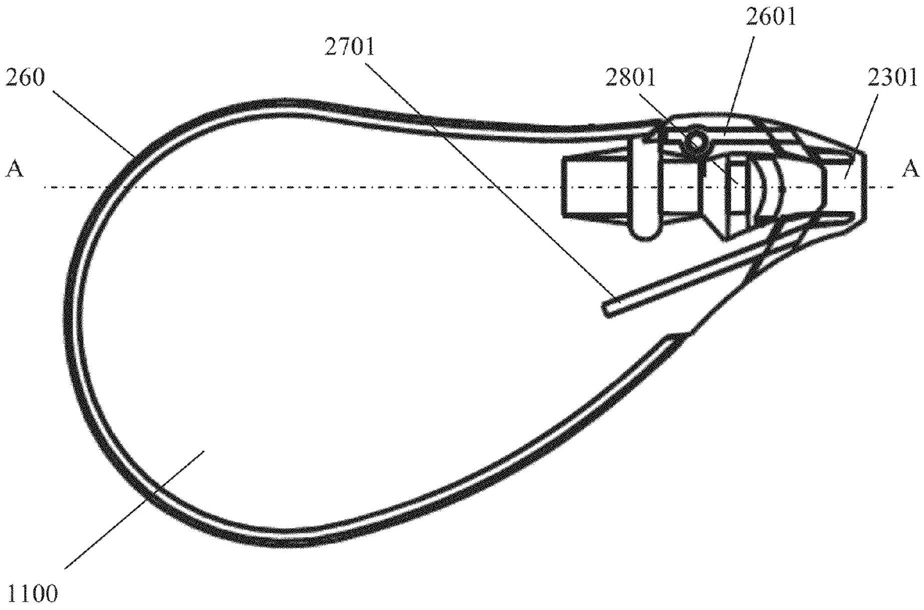
FIG. 45 is a bottom view of a horizontal correction tape dispenser in accordance with the present invention.

Referring to FIGS. 36 and 45, the horizontal supporting means (2801) is preferred to be situated inside the top casing (260) and the applicator head (80) is partially covered by top casing (260). With this construction, the front end of the top casing (260) provides protection to the applicator head (80) in which it is used for preventing excess pressure applied on the applicator head (80) during operation. In these embodiments, the horizontal correction tape device (100) is able to reduce the number of components and the complexity of manufacturing the same where the applicator head and the body can be manufactured by using a single mould, and maintain the required structural strength and provide higher flexibility where it can withstand substantially a pressing weight of at least 1.5 kg to at most 5 kg acted on the applicator head (80) (as above-mentioned). Also, the applicator head (80) is made of preferably but not limited to polypropylene or polyamide. The technical data of polypropylene and polyamide are summarized in the table below.

TABLE 3

Technical data of Polypropylene and Polyamide

| | Polypropylene | Polyamide |
|---|---|---|
| Max. Temperature | 135° C. | 99° C. |
| Min. Temperature | 0° C. | −70° C. |
| Melting Point | 170° C. | 216° C. |
| Tensile Strength | 31 Mpa | 40 Mpa |
| Hardness | R95 | R92 |
| Specific Gravity | 0.90 | 1.13 |

A summary then of what has been hereinbefore described by way of example of the present invention is a horizontal correction tape device (100) for applying the correction tape (20) onto a surface, comprising a body (20), a top casing (260), and an applicator head (80), characterized in that the applicator head (80) comprises a first vertical supporting means (2101), a second vertical supporting means (2201), a tapered guiding means (2301), and at least a horizontal supporting means (2801) attached in between the first and second vertical supporting means (2101), (2201).

While in the foregoing specification this invention has been described in relation to certain preferred embodiments thereof and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A tape device (100) comprising:

a strip of tape (20) having supply tape (22) and take up tape (24);

a spool portion (130);

a supply spool (40) for winding the supply tape (22), the supply spool (40) is disposed at the spool portion (130);

a take up spool (50) for winding the take up tape (24), the take up spool portion (130) is disposed at the spool portion (130);

an applicator tip (120), the supply tape (22) travels from the supply spool (40) to the applicator tip (120), and the take up tape (24) travels from the applicator tip (120) to the take up spool (50); and a spool mechanism (70) for allowing the supply and the take up spools (40 & 50) to rotate such that the tape (20) travels from the supply spool (40), around the applicator tip (120), and to the take up spool (50);

characterized in that the tape device (100) further comprises a tape guiding mechanism (10) for guiding the tape (20), and for preventing tape loosening; the tape guiding mechanism (10) comprising:

an application portion (60) having an applicator head (80), the application portion (60) is formed in a substantially flat shape occupying a single plane (140), and the tape (20) travels around the application portion (60) substantially on the single plane (140);

a slit (110) for allowing the supply tape (22) to pass through, the slit (110) is formed at a rear portion (84) of the application portion (60);

a slant (90) with a front edge (410) connected substantially to the rear portion (84) of the application portion (60); the slant (90) bends downwards from the rear portion (84) of the application portion (60) to the spool portion (130); and the slant (90) causes the spool portion (130) to locate the spools (40 & 50) in such a manner that the single plane (140) of the application portion (60) is substantially aligned with the plane (150) between the spools (40 & 50).

2. A tape device (100) as claimed in claim 1 wherein the tape guiding mechanism (10) is designed for guiding and allowing the tape (20) to travel from the supply spool (40) to the application portion (60), along the application portion (60) on the single plane (140) towards the applicator tip (120) direction, through the slit (110), around the applicator tip (120), along the application portion (60) on the single plane (140) towards the take up spool (50) direction, on the slant (90), and back to the take up spool (50) in a substantially tight manner; and for preventing tape loosening.

3. A tape device (100) as claimed in claim 2 wherein the slit (110) and the applicator head (80) guide the tape (20) to move towards the applicator tip (120); and the tape (20) traveling along the application portion (60) substantially in the aligned planes (140 & 150) optimizes the guidance provided by the tape guiding mechanism (10).

4. A tape device (100) as claimed in claim 3 wherein the application portion (60) is formed in a substantially elongated flat shape, the application portion (60) is substantially of a length and of a thickness, the slant (90) bends downwards substantially at a first angle (440), the front edge (410) of the slant (90) makes a second angle (450) from the lengthwise axis (460) of a tape traveling path (430) on the application portion (60); the slant (90) occupies substantially a horizontal length (340 being substantially parallel to the plane between the spools (40 and 50)); the length, thickness, and the shape of the application portion (60), and the first and the second angles (440 & 450) and the horizontal length (340) of the slant (90) are sufficient for the tape guiding mechanism (10) to guide the tape (20) and prevent tape loosening.

5. A tape device (100) as claimed in claim 3 the application portion (60) is substantially of a length and of a thickness, the slant (90) bends downwards substantially at a first angle (440), the front edge (410) of the slant (90) makes a second angle (450) from the lengthwise axis (460) of a tape traveling path (430) on the application portion (60), and the slant (90) occupies substantially a horizontal length (340 being substantially parallel to the plane between the spools (40 and 50)); and the length, thickness, and the shape of the application portion (60), and the first and the second angles (440 & 450) and the horizontal length (340) of the slant (90) are sufficient for pulling the tape (20) substantially towards the spool direction such that the tape (20) travels around the application portion (60) in the single plane (140) in a substantially flat and tight manner.

6. A tape device (100) as claimed in claim 5 wherein the tape guiding mechanism (10) further comprises at least one guiding shaft (170) for guiding the supply tape (22) from the supply spool (40) along the application portion (60) to the slit (110); and guiding the take up tape (24) from the slant (90) to the take up spool (50); and the at least one guiding shaft (170) is formed on the slant (90) substantially parallel to the axis of rotation of the spools (40 & 50).

7. A tape device (100) as claimed in claim 6 further comprising a base (180), wherein the applicator head (80), the slit (110) and the slant (90) are formed on the base (180).

8. A tape device (100) as claimed in claim 7 wherein the application portion (60) comprises an application profile (190) that bends from side to side on the cross-section thereof along the lengthwise extent of the application portion (60), and the application profile (190) is selected from a group consisting of for guiding the tape (20) on the application portion (60); for providing flexibility to the application head (80); and both of these functions.

9. A tape device (100) as claimed in claim 8 wherein the applicator head (80) further comprises at least one cut-out section (210); a plurality of spines (220) defining the at least one cut-out section (210) in between; and at least one bridge (230) connected between the spines (220) across the cut-out section (210); the bridge (230) is substantially protruded upwards from the applicator head (80); and the bridge (230) is for further guiding the tape (20) on the applicator head (80).

10. A tape device (100) as claimed in claim 9 wherein the application portion (60) further comprises a tape guiding member (610 & 620) forming a tape guiding groove (240) formed along the tape-traveling path (430) along the application portion (60) for further guiding the tape (20) on the application portion (60).

11. A tape device (100) as claimed in claim 10 wherein the single plane (140) is substantially flat and thin; the single plane (140) is disposed substantially on a horizontal plane; and the slit (110) and applicator tip (120) are aligned along the lengthwise axis (460) of the application portion (60) on the same single plane (140).

12. A tape device (100) as claimed in claim 11 wherein the application portion (60) is of a length substantially in the range of from $2.5\times10^{-2}$ m to $3.5\times10^{-2}$ m and of a thickness substantially in the range of $5.0\times10^{-4}$ m to $3.0\times10^{-3}$ m; the slant (90) is bending downwards at a first angle (440) substantially in the range of from 30° to 48° from the horizontal plane; the front edge (410) of the slant (90) makes a second angle (450) in the range of from 25° to 55° from the lengthwise axis (460) of a tape traveling path (430) on the application portion (60); and the slant (90) occupies the horizontal length (340) substantially in the range of $5.0\times10^{-3}$ m to $1.5\times10^{-2}$ m.

13. A tape device (100) as claimed in claim 12 wherein the tape device (100) is a correction tape dispenser device; the tape (20) is a correction tape having a correction layer (30) attached to the supply side (160) thereof; the supply side (160) is disposed at the outer side (380) of the tape (20) when traveling along the applicator head (80) at the application side (370) thereof; the correction layer (30) is adhesive at the outer side (390) thereof such that the correction layer (30) peels off and attaches itself to a surface (360) that it contacts with during an application of the tape (20) onto the surface (360); and the application takes place substantially at the applicator tip (120).

14. A tape device (100) as claimed in claim 13 wherein the correction tape dispenser device is a horizontal correction tape dispenser device; the axis of rotation of the spools (40 & 50) is arranged perpendicular to the applicator tip (120); and the single plane (140) of the application portion (60) is located perpendicular to the axis of rotation of the spools (40 & 50).

15. A tape device (100) as claimed in claim 14 wherein the lengthwise cross section on the base (180) where the application portion (60) bends into the slant (90) and the slant (90) turns into the spool portion (130) follows a configuration selected from a group consisting of a curved configuration (490) and a zigzag configuration (480); and the lengthwise cross-section of the application profile (190) follows a configuration selected from a group consisting of a curved configuration and a zigzag configuration (580).

16. A tape device (100) as claimed in claim 1 for dispensing tape (20) onto a surface comprising:

a casing including a base (180) and a top casing (260);

a spool shaft (310) for retaining a correction tape spool inside the casing;

the applicator head (80) having the applicator tip (120) positioned at the edge of the casing for transferring a correction layer (30) onto the surface;

a guide means for providing alignment between the spool shaft (310) and the applicator tip (120); and a plurality of connectors (16) for connecting the casing;

characterized in that the spool shaft (310), the applicator head (80), and the guide means constitute the base (180), forming a single entity of which the applicator tip (120) and the base (180) subsist on the same orientation, and the single entity is provided with the slit (110) for providing a passage for the correction tape.

17. A tape device (100) in accordance to claim 16, wherein the spool shaft (310) is embodied with a ratchet (51) to provide irreversible movement of the correction tape spool.

18. A tape device (100) in accordance to claim 16, wherein the applicator head (80) having the applicator tip (120) can withstand a pressing weight of at least 1.5 kg to at most 5 kg.

19. A tape device (100) in accordance to claim 16, wherein the guide means comprises either a rail (101), guiding shafts (170), a horizontal guide (103), or a combination thereof.

20. A tape device (100) in accordance to claim 19, wherein the rail (101) provides rotational guided movement of the correction tape spool.

21. A tape device (100) in accordance to claim 19, wherein the guiding shafts (170) are a pair of shafts extending upwards from the base (180) and aligned from the rail (101) towards the applicator tip (120).

22. A tape device (100) in accordance to claim 19, wherein the horizontal guide (103) is a descending slope to the slit (110) for exiting and winding the correction tape around the applicator tip (120).

23. A tape device (100) in accordance to claim 16, wherein the single entity of said base (180), the spool shaft (310), the applicator head (80) having the applicator tip (120), and the guide means is preferably made out of any group of polymer materials.

24. A tape device (100) in accordance to claim 16, wherein the single entity of said base (180), the spool shaft (310), the applicator head (80) having the applicator tip (120), and the guide means is preferably made out of ductile materials.

25. A tape device (100) in accordance to claim 19, wherein the single entity of said base (180), the spool shaft (310), the applicator head (80) having the applicator tip (120), and the guide means is preferably made out of elastic materials.

26. A tape device (100) in accordance to claim 20, wherein the single entity of said base (180), the spool shaft (310), the applicator head (80) having the applicator tip (120), and the guide means is preferably made out of any materials with a tensile strength range of 28 Mpa to 83 Mpa.

27. A tape device (100) as claimed in claim 1 comprising:

a top casing (260) having a curved surface (2100, 2200, 2300) for guiding a user's hand to hold the tape device (100);

a base (180) further having a slant (90) between the applicator tip (120) and a spool shaft (310) for guiding at least a finger of the user to hold the tape device (100) in a preferred manner;

the base (180) having a spool shaft (310), guiding shafts (170), and the applicator tip (120) integrated as a unibody.

28. A tape device (100) according to claim 27, whereby the slant (90) of the base (180) provides a raised platform (300) so that the contact plane between a supply spool and a take up spool is aligned with the applicator tip (120) for guiding a tape on the applicator tip (120).

29. A tape device (100) according to claim 27, whereby the inclination angle of the slant (90) lies between 30 degrees and 48 degrees from the base platform of the base (180).

30. A tape device (100) according to claim 27, whereby the slant (90) of the base (180) allows the tape to be in tension at the applicator tip (120).

31. A tape device (100) according to claim 27, whereby the slant (90) of the base (180) allows at least a finger to rest when the device is in use.

32. A tape device (100) according to claim 27, whereby the base (180) has a rear end (414) angled upwards for providing a rest support in the hand of a user when combined with the top casing (260).

33. A tape device (100) as claimed in claim 32, whereby the angled rear end (414) of the base (180) reduces exposure to sharp edges providing a safe grip.

34. A tape device (100) according to claim 27, whereby the top casing (260) has a shape that provides a holding grip for the hand of a user.

35. A tape device (100) according to claim 27, whereby the top casing (260) has a shape that provides a holding grip for both left-handed and right-handed users.

36. A tape device (100) according to claim 27, whereby the base (100) is embedded in the top casing (260) when assembled.

37. A tape device (100) according to claim 27, whereby a parting line between the base (180) and top casing (260) is at the bottom of the tape device (100).

38. A tape device (100) as claimed in claim 1 for applying the tape (20) onto a surface, comprising:

a body (1100) for accommodating a correction tape supply reel and take up reel (40 & 50);

an applicator head (80) attached to the front end of the body (1100); and a top casing (260) fastened on the body (1100) for covering the correction tape supply reel and take up reel (40 & 50);

characterized in that the applicator head (80) comprises:

a first vertical supporting means (2101);

a second vertical supporting means (2201);

a guiding means (2301) attached between the front ends of said first and second vertical supporting means (2101, 2201);

a first ridge (2401) having a first bent angle (241) and a second bent angle (242) laterally attached to the side surface of the first vertical supporting means (2101); and a second ridge (2501) having a third bent angle (251) and a fourth bent angle (252) laterally attached to the side surface of the second vertical supporting means (2201).

39. A tape device (100) in accordance with claim 38, wherein the first and second ridges (2401 & 2501) are in notch-shaped.

40. A tape device (100) in accordance with claim 38, wherein the applicator head (80) comprises a first bent ridge (2601) attached to the bottom surface of the first vertical supporting means (2101).

41. A tape device (100) in accordance with claim 38, wherein the applicator head (80) comprises a second bent ridge (2701) attached to the bottom surface of the second vertical supporting means (2201).

42. A tape device (100 in accordance with claim 38, wherein the first bent angle (241) is of in the range of 10°-16°.

43. A tape device (100) in accordance with claim 38, wherein the second bent angle (242) is in the range of 58°-64°.

44. A tape device (100) in accordance with claim 38, wherein the third bent angle (251) is in the range of 7°-13°.

45. A tape device (100) in accordance with claim 38, wherein the fourth bent angle (252) is in the range of 53°-59°.

46. A tape device (100) in accordance with claim 40, wherein the first bent ridge (2601) is placed perpendicular to the guiding means (2301) having one end of the first bent ridge (2601) attached to one end of the guiding means.

47. A tape device (100) in accordance with claim 41, wherein the second bent ridge (2701) extends outwardly to the body (1100) section from one end of the guiding means (2301).

48. A tape device (100) in accordance with claim 38, wherein the applicator head (80) comprises at least a horizontal supporting means (2801) attached in between the front ends and back ends of said first and second vertical supporting means (2101, 2201).

49. A tape device (100) in accordance with claim 48, wherein the horizontal supporting means (2801) comprises a protruded tip extended upwards on both ends of the horizontal supporting means (2801) for guiding the tape (20).

50. A tape device (100) in accordance with claim 38, wherein the guiding means (2301) is tapered with a pair of protruded side tips (231, 232) on the top and bottom surfaces for guiding the tape (20).

51. A tape device (100) in accordance with claim 48, wherein the horizontal supporting means (2801) is situated inside the top casing (260) when assembled.

52. A tape device (100) in accordance with claim 38, wherein the front end of the top casing (260) partially covers the applicator head (80) for preventing excess pressure applied on the applicator head (80) during operation.

53. A tape device (100) in accordance with claim 38, wherein the applicator head (80) is made of any type of polymer materials, which can withstand a weight of at least 1.5 kg to at most 5 kg.

* * * * *